(12) United States Patent
Moody et al.

(10) Patent No.: US 7,305,879 B2
(45) Date of Patent: Dec. 11, 2007

(54) CROSS-COMPONENT SUPERCONDUCTING GRAVITY GRADIOMETER WITH IMPROVED LINEARITY AND SENSITIVITY AND METHOD FOR GRAVITY GRADIENT SENSING

(75) Inventors: Martin Vol Moody, Kensington, MD (US); Ho Jung Paik, Silver Spring, MD (US)

(73) Assignee: University of Maryland, College Park, MD (US)

( * ) Notice: Subject to any disclaimer, the term of this patent is extended or adjusted under 35 U.S.C. 154(b) by 0 days.

(21) Appl. No.: 11/377,293

(22) Filed: Mar. 17, 2006

(65) Prior Publication Data

US 2006/0207326 A1    Sep. 21, 2006

Related U.S. Application Data

(60) Provisional application No. 60/663,022, filed on Mar. 18, 2005.

(51) Int. Cl.
*G01V 7/00* (2006.01)
*G01P 15/11* (2006.01)

(52) U.S. Cl. ............... 73/382 R; 73/382 G; 73/514.31

(58) Field of Classification Search .............. 73/382 R, 73/382 G, 514.31, 514.17, 510
See application file for complete search history.

(56) References Cited

U.S. PATENT DOCUMENTS

| 3,722,286 A | * | 3/1973 | Weber | ....................... 73/382 R |
|---|---|---|---|---|
| 4,841,772 A | * | 6/1989 | Paik | .......................... 73/382 G |
| 5,224,380 A | * | 7/1993 | Paik | ............................ 73/510 |
| 5,505,555 A | | 4/1996 | van Kann et al. | |
| 5,587,526 A | * | 12/1996 | Lumley et al. | ........... 73/382 G |
| 5,668,315 A | | 9/1997 | van Kann et al. | |

OTHER PUBLICATIONS

Moody, M., et al., "Superconducting gravity gradiometer for space and terrestrial applications", Journal of Applied Physics, vol. 60, No. 12, Dec. 15, 1986, pp. 4308-4315.
Paik, H., "Superconducting tunable-diaphragm transducer for sensitive acceleration measurements", Journal of Applied Physics, vol. 47, No. 3, Mar. 1976, pp. 1168-1178.
Chan, H., et al., "Superconducting gravity gradiometer for sensitive gravity measurements", Physical Review D, vol. 35, No. 12, Jun. 15, 1987, pp. 3551-3571.
Moody, M., et al., "Gauss's Law Test of Gravity at Short Range", Physical Review Letters, vol. 70, No. 9, Mar. 1, 1993, pp. 1195-1198.
Forward, R., "Electronic cooling of resonant gravity gradiometers", Journal of Applied Physics, vol. 50, No. 1, Jan. 1979, pp. 1-6.

(Continued)

*Primary Examiner*—Helen Kwok
(74) *Attorney, Agent, or Firm*—Rosenberg, Klein & Lee

(57) ABSTRACT

A cross-component superconducting gravity gradiometer sensitive to off-diagonal components of the gradient tensor includes, for each gradient axis, a pair of closely matched angular accelerometers coupled by superconducting circuitry, including sensing circuits designed to minimize the sensitivity of the instrument to angular acceleration of the platform at which the angular accelerometers are mounted; and a mode-splitting circuitry designed to reduce a nonlinear coupling of angular acceleration to the output of the gravity gradiometer and to attain the operability of the instrument in a broader range in the frequency domain.

20 Claims, 11 Drawing Sheets

OTHER PUBLICATIONS

Moody, M, et al., "Three-axis superconducting gravity gradiometer for sensitive gravity measurements", Review of Scientific Instruments, vol. 73, No. 11, Nov. 2002, pp. 3957-3974.

Moody, M., et al., "Principle and performance of a supeconducting angular accelerometer", Review of Scientific Instruments, vol. 74, No. 3, Mar. 2003, pp. 1310-1318.

Paik, H., et al., 6 page preprint of "Airborne/Shipborne SGG Survey System", Proceedings of the International Symposium on Kinematic Systems in Geodesy, Geomatics and Navigation (Banff, Canada, Jun. 1997), pp. 565-570.

Paik, H. J., "Superconducting tensor gravity gradiometer", Second International Symposium on Inertial tTechnology of Surveying and Geodesy, Banff, Canada, Jun. 1981.

\* cited by examiner

US 7,305,879 B2

CROSS-COMPONENT SUPERCONDUCTING GRAVITY GRADIOMETER WITH IMPROVED LINEARITY AND SENSITIVITY AND METHOD FOR GRAVITY GRADIENT SENSING

This Utility Patent Application is based on Provisional Patent Application Ser. No. 60/663,022 filed 18 Mar. 2005.

FIELD OF THE INVENTION

The present invention is directed to sensing variations in the Earth's gravity field, and in particular to the field of gravity gradiometry.

In overall concept, the present invention is directed to a cross-component superconducting gravity gradiometer sensitive to off-diagonal components of the gradient tensor in which a pair of closely matched angular accelerometers are employed for each gradient axis. Sensing circuits associated with the angular accelerometers are designed to minimize the sensitivity of the instrument to angular acceleration of the platform to which the angular accelerometers are mounted.

The present invention is further directed to a cross-component superconducting gravity gradiometer having mode-splitting circuitry designed to reduce non-linear coupling of angular acceleration to the output of the gravity gradiometer and to attain the operability of the instrument in a broader range in the frequency domain for the measure of angular motion.

Still further, the present invention is directed to a superconducting gravity gradiometer including, at each axis two closely matched spring-mass assemblies coupled by superconducting circuitry containing inductive elements which are sensitive to acceleration along the sensitive axes of the gradiometer. The inductive elements are designed and oriented such that their inductance is closely proportional to the displacement of the mass. Persistent currents of predetermined values are stored in the superconducting circuitry to establish a mode of operation of the sensing circuits in the instrument and to improve its performance. The persistent currents may be adjusted for various mismatched parameters in the gradiometer.

Further, the present invention is directed to a superconducting gravity gradiometer which includes three pairs of angular accelerometers. Each pair of angular accelerometers contain a pair of closely matched spring-mass assemblies coupled by super conducting circuitry containing inductive elements and connected in parallel to a Superconducting Quantum Interference Device (SQUID) and three linear accelerometers, all positioned on respective faces of a platform (precision cube), where the cryogenic conditions are provided by a closed-cycle refrigerator.

BACKGROUND OF THE INVENTION

The variation in the Earth's gravity field causes a significant error in autonomous navigation. An accurate gravity gradient sensor is needed to alleviate this error. A highly sensitive gravity gradiometer has been demonstrated at the University of Maryland. (M. V. Moody, E. R. Canaan, and H. J. Paik, "Three-axis superconducting gravity gradiometer for sensitive gravity experiments," *Rev. Sci. Instrum.*, vol. 73, pp. 3957-3974, November 2002). The extremely high sensitivity of the device lies in the use of superconducting principles in the inductive sensing and on the general stability of material properties at extremely low temperatures. This "Superconducting Gravity Gradiometer (SGG)" employs linear accelerometers to independently measure the three diagonal, or in-line, components of the gravity gradient tensor.

The schematic circuit diagram for a gradiometer axis of the SGG is shown in FIG. 1. The instrument comprises a total of nine single-axis accelerometers. Six linear accelerometers are mounted on the axes of a precisely machined cube with the sensitive axes perpendicular to the faces of the cube. The test masses of the accelerometers on opposing faces are coupled by superconducting circuits to form three orthogonal gradiometers. In addition, three superconducting angular accelerometers (SAAs) are mounted with their sensitive axes aligned with the three gradiometer axes. In this arrangement, the differential linear accelerations correspond to the three diagonal components of the gravity gradient tensor. The three components of the platform linear acceleration are sensed as the common acceleration of the gradiometer test masses. These signals, along with the angular acceleration, permit correction of dynamic errors in all six degrees of freedom.

The test masses are levitated against gravity by storing a persistent current $I_L$, using a resistive heat-switch $R_L$, in the loop formed by $L_{L1}$ and $L_{L2}$ (in zero-g, a second circuit and current would provide an opposing force). The coils $L_{S1}$ and $L_{S2}$ are connected in parallel through a transformer to a SQUID to form a sensing circuit. The transformer $L_{t1}$ and $L_{t2}$ provides impedance matching and limits the dc current flowing through the SQUID input coils, $L_{S3}$.

Though only one is shown, each axis of the gradiometer actually has two sensing circuits wound on the same coil form. In one circuit, the currents are stored in the same direction (using heat-switch $R_{SS}$), as shown in FIG. 1. In this case, after obtaining the proper ratio of $I_{S1}$ and $I_{S2}$ to null sensitivity to common-mode acceleration, the SQUID detects the differential acceleration, or gravity gradient. In the other circuits, the currents are stored in the opposite direction (using $R_{SF}$), and the SQUID detects the common-mode acceleration signal. Signal balancing is attained by means of stable persistent currents prior to detection.

Based on the technological success of the SGG, a variation that would be more suitable for the harsh motion environment of a land or sea vehicle is being assembled. This gradiometer makes use of angular accelerometers, very similar to those designed for the in-line SGG, to measure off-diagonal components of the gradient tensor (R. L. Forward, *J. Appl. Phys.* Vol. 50, pp. 1-6, January 1979; F. J. van Kann et al., Laboratory tests of a mobile superconducting gravity gradiometer," vol. 165 & 166, pp. 93-94, August 1990). Due to its design, the cross-component SGG has a major advantage in obviating linear acceleration errors. This property is important on a land or sea vehicle since large linear displacements prohibit platform stabilization in the linear degrees of freedom, whereas rotational stabilization of instrument platforms is conventional.

A sensitive angular accelerometer has been developed (M. Vol Moody et al., "Principle and performance of a superconducting angular accelerometer," Review of Scientific Instruments, March 2003, V. 74, Number 3, p.p. 1310-1318). Schematic of the angular accelerometer sensing circuit is presented in FIG. 2.

Three of these superconducting angular accelerometers (SAAs) have been constructed and tested in conjunction with the three-axis superconducting gravity gradiometer (SGG) with one angular accelerometer being used for each sensing axis of the SGG.

As in the design of the SGG, the Meissner effect and flux quantization are used to efficiently couple the test mass displacement to a SQUID amplifier.

In the SAA, a test mass, which is nearly semicircular in shape, is supported by a flexure pivot located at its center of mass (c.m.). Both the test mass and pivot are formed by a single cut made with a wire electric discharge machine (EDM) in a niobium (Nb) disk. The flexure is extremely rigid in all linear degrees of freedom and for rotations in the plane of the sensor leading to a rugged yet sensitive device. The cavities below the test mass provide pockets for the SQUID sensor, transformer, heat switches, and high current joints.

Elements of the displacement sensing circuit, schematically illustrated in FIG. 2, are housed in cavities machined into the disk. Spiral coils $L_{S1}$ and $L_{S2}$, for sensing test mass motion are located on the upper surfaces of these forms. The pockets in the lower half of the disk contain the heat switches (small carbon resistors for storing current), a Quantum Design dc SQUID, superconducting wire-to-wire joints, and an impedance-matching transformer. The Nb housing and cover plates form an optimum magnetic shield for the SQUID and other circuit elements. The size and circular shape permit ease of mounting to the SGG.

The sensing coils are connected in parallel to the SQUID input coil, $L_{S3}$, through the impedance-matching transformer, $L_{t1}$ and $L_{t2}$. Two heat switches permit flux to be trapped in either the same (with heat-switch $R_{SS}$) or opposite sense (with heat-switch $R_{SP}$). Heat-switch $R_{SQ}$ is turned on while storing current to protect the SQUID. In the first case, persistent current initially flows only through the two sensing coils. In the second case the persistent current flows through the transformer primary and then splits between the two coils, which is the primary operating mode. In this case, an angular deflection of the superconducting test mass increases the inductance of one coil and decreases that of the other through the Meissner effect. This forces current to flow through the transformer, generating a signal at the SQUID proportional to test mass deflection.

Despite the satisfactory characteristics of the SGG employing an SAA at each gradiometer axis as presented in previous paragraphs, these SAAs were used to measure angular motion of the instrument platform but not gravity gradients. The SGG instrument presented in the paper of M. Vol Moody, et al, published in 2003, consists of six linear and three angular accelerometers. By measuring differences between pairs of linear accelerometers, the device provides the three diagonal components of the gravity gradient tensor. The angular accelerometers were used to determine errors in the SGG that couple to angular motion. This SGG was developed for space applications, where the acceleration environment is relatively mild. However, the platform motion environment of an aircraft, ship or land vehicle is far more hostile than that of a spacecraft. The angular motion can be controlled using a stabilized platform; however, the translational acceleration cannot be controlled as the translational displacements often exceed the dimensions of the vehicle. The linear accelerometers used in the prior SGG to measure the gravity gradients would suffer large displacements under the expected motion environment of an aircraft or ship. Under such large displacements, the nonlinear terms in the accelerometer transfer functions would mask any expected gravity gradient signal.

It is therefore desirable to have an instrument operating in extremely harsh environments to measure gravity gradients, which has high linearity in large acceleration environments, broad bandwidth, and reduced sensitivity to motions of the platform to which the instrument is mounted.

Further, although the cryogenic instrument benefits both from the reduced thermal noise and from the stability of superconducting circuits and material properties at near-zero temperatures which permits precise matching of scale factors and accurate rejection of dynamic errors, one of the main perceived drawbacks of the SGG however has been the necessity for a liquid helium cryostat.

Therefore, a SGG free of a liquid helium cryostat would be desirable.

SUMMARY OF THE INVENTION

It is therefore an object of the present invention to provide a superconducting gravity gradiometer having improved linearity of the instrument in high acceleration environments.

It is another object of the present invention to provide a cross-component superconducting gravity gradiometer employing a sensing circuit permitting nulling of the sensitivity to platform acceleration as well as to compensate for various mismatched parameters with circuitry for broad splitting of the resonance modes for further reducing the sensitivity to the platform angular acceleration.

It is still another object of the present invention to provide a superconducting gravity gradiometer suitable for the harsh motion environment and in which the use of a liquid helium cryostat is avoided.

It is a further object of the present invention to provide a cross-component superconducting gravity gradiometer with improved operational characteristics which are attained by employing, at each gradiometer axis, a pair of closely matched angular accelerometer assemblies coupled by superconducting circuitry, where sensing circuits difference the signals from the angular accelerometers to minimize the sensitivity to angular accelerations of the platform.

It is still another object of the present invention to provide a cross-component superconducting gravity gradiometer using superconducting circuits containing inductive loops, wherein, by properly storing persistent current in the inductive loops, a substantial reduction in the nonlinear coupling of angular acceleration to the output of the gradiometer may be attained.

The present invention in one form represents a cross-component superconducting gravity gradiometer which includes at each gradiometer axis, a pair of closely matched spring-mass assemblies coupled by superconductive circuitry containing inductive elements. The spring, test-mass, and superconducting circuitry constitute an angular accelerometer sensitive to off-diagonal components of the gradient tensor.

The cross-component superconducting gravity gradiometer includes three pairs of angular accelerometers, each pair of accelerometers being positioned perpendicular each to the other. The angular accelerometers in a single pair have their sensitive axes aligned and are positioned at opposing faces of a cube which constitutes a rigid platform.

The superconducting circuitry includes inductive elements located in close proximity to the test masses, and are designed and oriented in such a fashion that their inductance is closely proportional to the displacement of the test mass about the sensitive axis.

The gravity gradiometer also includes three linear accelerometers each positioned along a gradiometer axis.

In operation, the gravity gradiometer has two principal resonance modes: one that is excited primarily by an acceleration that displaces the test masses in a common direction (common-mode), and a second, which is excited primarily by acceleration that displaces the test masses in opposite directions (differential mode).

Each pair of the matched angular accelerometers has two identical sensing circuits for detecting signals. One sensing circuit is for differential mode acceleration, while another is for common mode. In the three-axis gradiometer there are six sensing circuits.

Each sensing circuit is composed of four closely matched inductors distributed in two superconducting loops containing the persistent currents $I_1$ and $I_2$. These two loops are connected in parallel to the primary coil of a superconducting transformer forming two additional loops containing persistent currents $I_3$ and $I_4$. The secondary coil of the superconducting transformer is connected to the input coil of the SQUID amplifier.

Each superconducting loop has two inductors (also referred to as inductive sensing elements or coils), arranged symmetrically about the pivot point of each test mass to provide symmetric torques on the test masses.

The four coils of each sensing circuit are configured in a circuit containing four closed loops, which give additional adjustable parameters. These additional parameters can be used to obtain a broad-frequency balance and reduction of mismatch in the non-linear response functions of the angular accelerometers. The inductors are positioned such that their inductances vary in the opposite sense for a test mass rotation about the c.m.

In operation, persistent currents are stored in the superconducting loops comprising the inductive sensing elements by momentarily heating a small section of the loop while applying a current with an external power source. By storing persistent currents of predetermined values in each of the pairs of the sensing circuits using respective resistors (heat switches), either the differential mode or the common-mode can be sensed in each sensing circuit.

The particular connection of the superconducting loops provides for the difference of the signals sensed from each angular accelerometer in each pair in order to minimize the sensitivity to angular acceleration of the platform.

A mode-splitting circuit is coupled to each pair of the angular accelerometers to substantially increase the common-mode resonance frequency of the coupled resonators. The mode-splitting circuitry has a negligible effect on the resonance frequency of the differential-mode sensing circuit. Since the sensitivity of the instrument is proportional to the inverse of the resonance frequency squared, the increase in the resonance frequency reduces sensitivity of the instrument to angular acceleration while not substantially affecting the sensitivity to gradient measurements.

For the three-axis gradiometer, there are three pairs of mode-splitting circuits. Each mode-splitting circuitry is composed of eight matched inductors distributed in two individual superconducting loops where each individual superconducting loop embraces a pair of spring-mass assemblies. In each pair of spring-mass assemblies, the conducting loop is represented by a circuit loop which has two inductors arranged symmetrically about the pivot point for each test mass. The inductors are positioned such that their inductances vary in the same sense for a test mass rotation about its c.m. Currents $I_a$ and $I_b$ of nearly equal magnitude are stored in the two loops using resistors (heat switches).

By increasing the common-mode resonance frequency, the mode-splitting circuitry serves to reduce the displacement of the test masses in response to angular acceleration of the platform which substantially reduces the nonlinear coupling of angular acceleration to the output of the gradient gradiometer. Additionally, by increasing the common-mode resonance frequency, the response of the instrument to acceleration is in a broadened frequency domain. This property is desirable in that it permits determination of the angular velocity well beyond the response bandwidth of the gradient sensing (differential) mode.

In order to avoid the use of a liquid helium cryostat, the cross-component superconducting gravity gradiometer is integrated with a closed-cycle refrigerator based on a dual-stage pulsed-tube cold-head. The pulsed-tube design has no reciprocating piston, thereby greatly reducing harmonics of pressure pulses. Thus, the cryogenic cross-component superconducting gravity gradiometer is formed which benefits from reduced thermal noise, increased stability of superconducting circuits and material properties at near zero temperatures. The system simultaneously enjoys the compactness, reliability and efficiency of a refrigerator capable of lower than 3K operation.

Each angular accelerometer, as well as each linear accelerometer employed in the gradiometer of the present invention, is formed from a single block of Nb which is cut to create the test mass, the spring, and the housing as one integral piece.

The present invention is also directed to a method of gravity gradient sensing which includes the steps of:

forming a cross-component superconducting gravity gradiometer by coupling, at each gradiometer axis, a pair of angular accelerometers (each angular accelerometer including a spring-mass assembly) by superconducting circuitry containing inductive elements;

positioning the inductive elements in close proximity to the mass of a respective angular gradiometer so that the inductances of the inductive elements change proportional to a displacement of the mass relative to the sensing axes thereof;

coupling the inductive elements in a manner to form separate substantially identical first and second sensing circuits for each pair of angular accelerometers (the first sensing circuit is used for sensing the common-mode motion, while the second sensing circuit is for sensing differential-mode motion);

coupling the inductive elements in parallel to a SQUID, coupling a pair of mode-splitting circuits to each pair of angular accelerometers where the overall mode-splitting circuitry includes a pair of superconducting circuits each comprising four matched coils, and where each two of the four coils in each of the pair of superconducting circuits is positioned symmetrically about a pivot point of respective angular accelerometers;

mating the formed instrument with a closed-cycle refrigerator to cool the instrument to cryogenic temperatures;

turning the SQUID electronics ON; and storing persistent currents of respective predetermined values in the inductive elements of the first and second sensing circuits and mode-splitting circuitry to control the first sensing circuit to operate in the differential mode, while controlling the second sensing circuit to sense the common-mode, and to increase the common-mode resonance frequency.

The method as herein described further includes the steps of:

(a) storing the persistent currents in sensing circuits of linear accelerometers and in the common-mode sensing circuits of the angular accelerometers (at this point, the instrument can measure platform acceleration in all six degrees of freedom);

(b) storing the persistent currents in the mode-splitting circuits to tune the gradiometer common-mode resonance frequency to a desired value which is dependent on the anticipated motion environment;

(c) storing the persistent currents in the differential-mode sensing circuits of the angular accelerometers.

Further, the platform is shaken about the sensitive axis of the pairs of angular accelerometers while monitoring the output of the gradiometer. Based on the transfer function between the common-mode and differential-mode signals, adjustments are made to the persistent currents in the differential-mode sensing circuit to optimize canceling of the sensitivity to platform motion. This process is iteratively repeated for all three gradiometer axes.

Once balanced against sensitivity to along axis motion, a gradiometer axis is shaken in other degrees of freedom, while monitoring all acceleration outputs. This permits determination of various error coefficients.

The instrument is then ready for measuring gravity gradient signals. During the measurement, the acceleration outputs are recorded along with the gradient output. The acceleration signals are combined with the gradient signal at a level determined by the measured error coefficients to correct for the instrument errors.

Three pairs of angular accelerometers are positioned perpendicular each to the other, with accelerometers in each pair positioned on the opposite faces of a precision cube (platform) where their sensitive axes aligned. Additionally, three linear accelerometers are attached to the cube with each linear accelerometer relating to a gradient axis.

This and other features and advantages of the present invention will be clear from further description of the preferred embodiment in conjunction with the drawings.

DESCRIPTION OF THE PREFERRED EMBODIMENTS

The cross-component superconducting gravity gradiometer 10 of the present invention is designed based on the following principles of gravity gradiometry:

Gravity may be described by an unobservable potential $\phi(x_i,t)$. Its first spatial derivatives form a field vector: $g_i \equiv -\partial\phi/\partial x_i$. This gravitational field is uindistinguishable from platform acceleration by the Equivalence Principle. The intrinsic field that uniquely characterizes the gravity field is the "gravity gradient" tensor:

$$\Gamma_{ij} \equiv \partial^2\phi/\partial x_i \partial x_j. \quad (\text{Eq. 1})$$

The gravity-gradient tensor is symmetric. Its trace is relative to the local mass density by Poisson's equation, an expression of the inverse-square law:

$$\sum_i \Gamma_{ii} = \nabla^2 \phi = 4\pi G \rho \quad (\text{Eq. 2})$$

In free space ($\rho=0$), this trace vanishes. This leaves only five independent components for $\Gamma_{ij}$: two diagonal ("in-line") and three off-diagonal ("cross") components.

Figure 1:
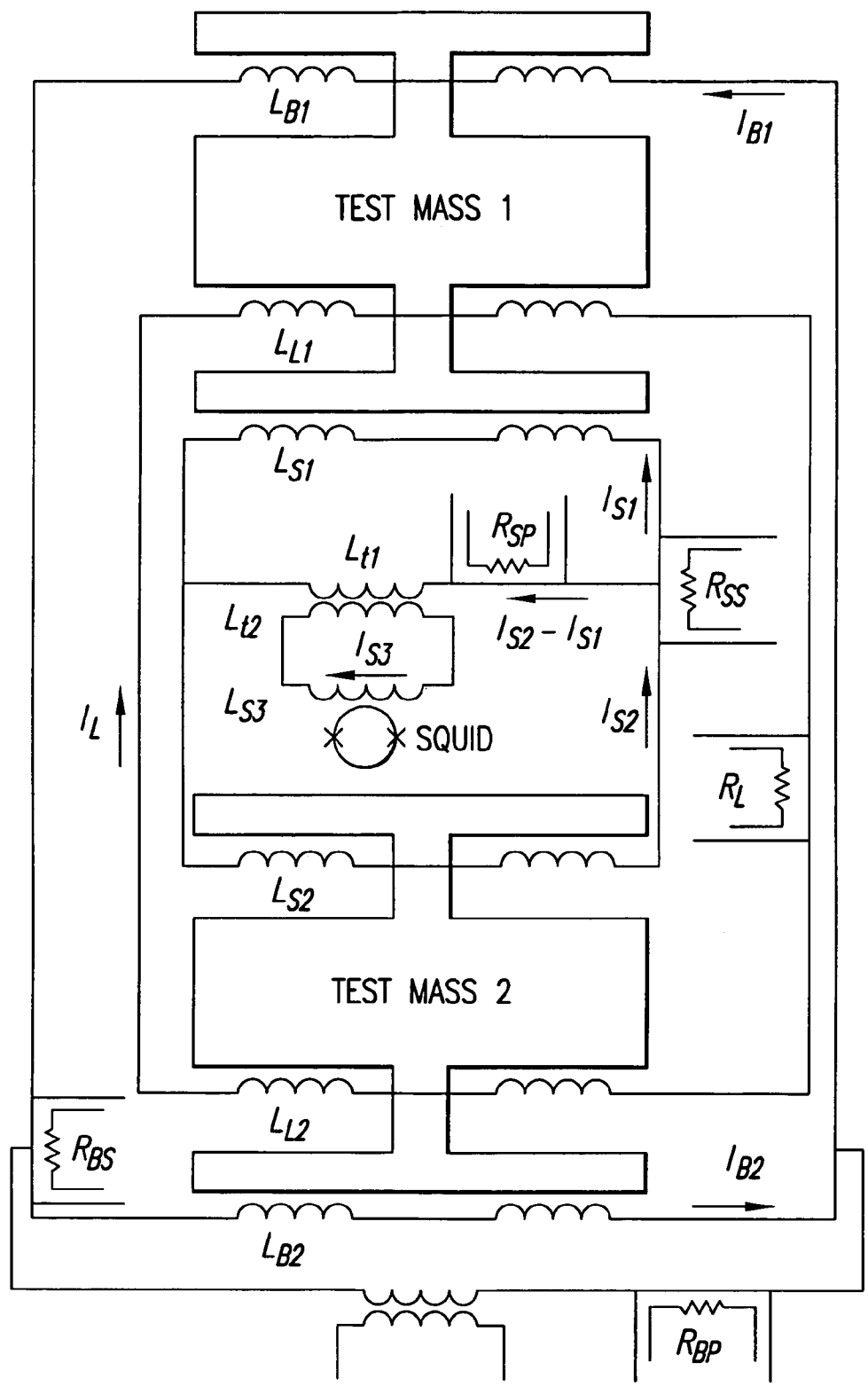
FIG. 1 is a circuit diagram for a gradiometer axis of a gradiometer of the prior art based on linear accelerometers.
Figure 2:
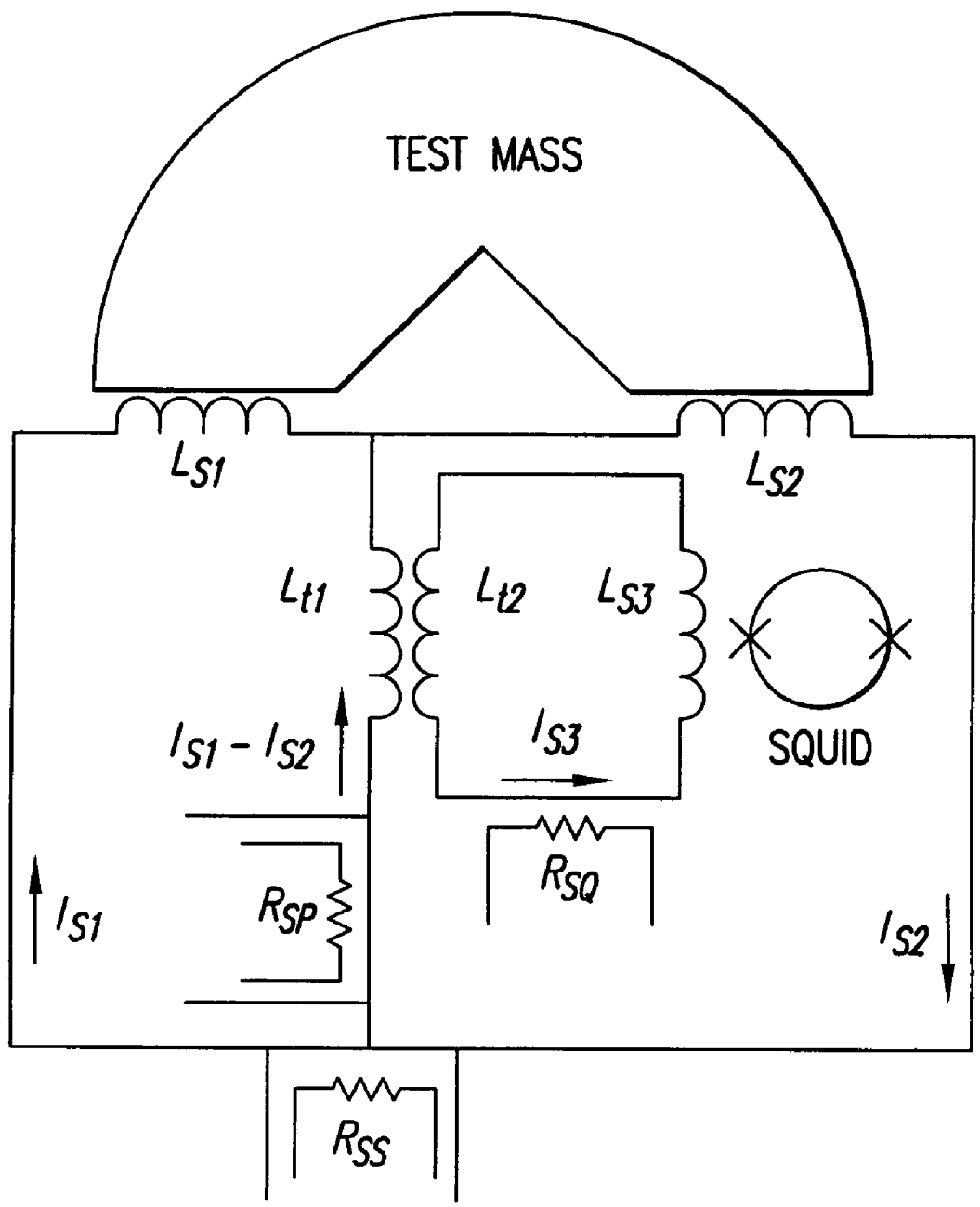
FIG. 2 is a circuit diagram of an angular accelerometer sensing unit of the prior art.
Figure 3A:
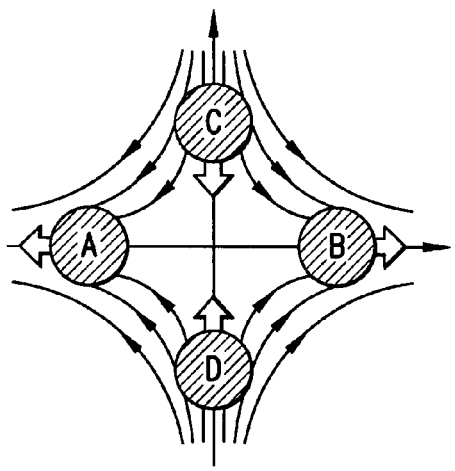
FIG. 3A is a diagram illustrating an inline component gradiometer which is constructed by differencing linear accelerations between two masses A and B, or C and D.
Figure 3B:
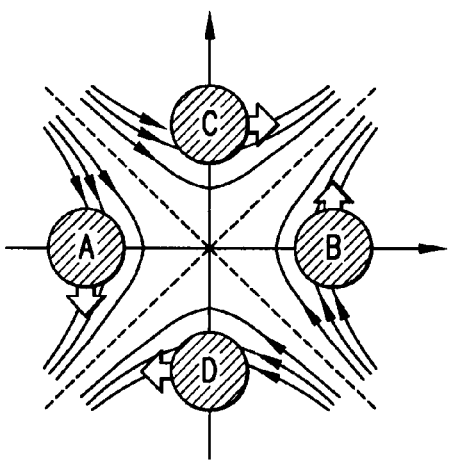
FIG. 3B is a diagram representing a cross-component gradiometer which is constructed by combining linear accelerations of four masses A, B, C, and D, or by differencing angular acceleration between two rotating arms AB and CD.

In an in-line component gradiometer, the differencing of the signals is used between two linear accelerometers whose sensitive axes are aligned along their separation vector, as shown in FIG. 3(a). In a cross-component gradiometer, the signals are combined from four linear accelerometers having sensitive axes as indicated in FIG. 3(b) or signals are differenced between two concentric angular accelerometers whose moment arms are oriented orthogonal to each other.

In a rotating reference frame, the measured gravity gradient is related to the gradient in the inertial frame by $$\Gamma' = \begin{pmatrix} \Gamma_{11} + (\Omega_2^2 + \Omega_3^2) & \Gamma_{12} - \Omega_1\Omega_2 & \Gamma_{13} - \Omega_1\Omega_3 \\ \Gamma_{21} - \Omega_2\Omega_1 & \Gamma_{22} + (\Omega_3^2 + \Omega_1^2) & \Gamma_{23} - \Omega_2\Omega_3 \\ \Gamma_{31} - \Omega_3\Omega_1 & \Gamma_{32} - \Omega_3\Omega_2 & \Gamma_{33} + (\Omega_1^2 + \Omega_2^2) \end{pmatrix}, \quad (\text{Eq. 3})$$

where $\Omega + \{\Omega_1, \Omega_2, \Omega_3\}$ is the angular rate vector in the gradiometer coordinate system. The centrifugal acceleration (angular rate squared) terms represent an important error source. The nonlinear nature of these terms is especially troublesome as it results in high-frequency platform jitter, outside the signal band, being transformed to lower frequencies within the signal band—a process referred to as downconversion.

An angular accelerometer, with its sensitive axis in a "3" direction, measures $$\Omega_3 = a_3 + \frac{J_{12}}{J_{33}}(\Gamma_{22} - \Gamma_{11} + \Omega_2^2 - \Omega_1^2) - \frac{(J_{22} - J_{11})}{J_{33}}(\Gamma_{12} - \Omega_1\Omega_2), \quad \text{(Eq. 4)}$$

where J is the moment of inertia tensor of the accelerometer moment arm.

A second aligned angular accelerometer, with its moment arm rotated by 90° about the sensitive axis, will measure the same quantity, with the indices 1 and 2 interchanged. Therefore, by summing and differencing the two signals, the angular acceleration $\alpha_3$, and the gradients, $\Gamma_{22}-\Gamma_{11}$ and $\Gamma_{12}$ can be separated. If the two moment arms are aligned along the coordinate axes 1 and 2, $J_{12}$ vanishes while $J_{22}-J_{11}$ becomes a maximum. The differential accelerometer then measures $\Gamma_{12}$. If, on the other hand, the moment arms are rotated by 45° from the coordinate axes, $J_{22}-J_{11}$ vanishes while $J_{12}$ becomes a maximum. In this case, the device measures $\Gamma_{22}-\Gamma_{11}$.

The change in the gravitational acceleration for an inertial sensor in motion is given by $$\frac{\partial \phi}{\partial x} = \int \frac{\partial^2 \phi}{\partial x^2}\frac{dx}{dt}dt + \int \frac{\partial^2 \phi}{\partial x \partial y}\frac{dy}{dt}dt + \int \frac{\partial^2 \phi}{\partial x \partial z}\frac{dz}{dt}dt \quad \text{(Eq. 5)}$$
$$= \int (\Gamma_{xx}v_x + \Gamma_{xy}v_y + \Gamma_{xz}v_z)dt,$$

$$\frac{\partial \phi}{\partial y} = \int \frac{\partial^2 \phi}{\partial y \partial x}\frac{dx}{dt}dt + \int \frac{\partial^2 \phi}{\partial y^2}\frac{dy}{dt}dt + \int \frac{\partial^2 \phi}{\partial y \partial z}\frac{dz}{dt}dt \quad \text{(Eq. 6)}$$
$$= \int (\Gamma_{xy}v_x + \Gamma_{yy}v_y + \Gamma_{yz}v_z)dt,$$

$$\frac{\partial \phi}{\partial z} = \int \frac{\partial^2 \phi}{\partial x \partial z}\frac{dx}{dt}dt + \int \frac{\partial^2 \phi}{\partial y \partial z}\frac{dy}{dt}dt + \int \frac{\partial^2 \phi}{\partial z^2}\frac{dz}{dt}dt \quad \text{(Eq. 7)}$$
$$= \int (\Gamma_{xz}v_x + \Gamma_{yz}v_y + \Gamma_{zz}v_z)dt,$$

where $\phi$ is the gravitational potential at point (x,y,z). Hence to fully determine the change in position using inertial guidance, the full gradient tensor is required. The full tensor is obtained in the gradiometer 10 of the present invention with various combinations of linear and angular accelerometers.

For motion in a horizontal plane this simplifies to a requirement for vertical deflection compensation:

$$\frac{\partial \phi}{\partial x} = \int \frac{\partial^2 \phi}{\partial x^2}\frac{dx}{dt}dt + \int \frac{\partial^2 \phi}{\partial x \partial y}\frac{dy}{dt}dt \quad \text{(Eq. 8)}$$
$$= \int (\Gamma_{xx}v_x + \Gamma_{xy}v_y)dt,$$

$$\frac{\partial \phi}{\partial y} = \int \frac{\partial^2 \phi}{\partial x \partial y}\frac{dx}{dt}dt + \int \frac{\partial^2 \phi}{\partial y^2}\frac{dy}{dt}dt \quad \text{(Eq. 9)}$$
$$= \int (\Gamma_{xy}v_x + \Gamma_{yy}v_y)dt.$$

thus, two in-line ($\Gamma_{xx}$, $\Gamma_{yy}$) and one cross-component ($\Gamma_{xy}$) of the gravity gradient tensor must be detected.

These components are measured in the system of the present invention with a three-axis cross-component gradiometer having one axis in the xz-plane, one axis in the yz-plane, with arms 45° rotated ($\Gamma_{xx}-\Gamma_{zz}$,$\Gamma_{yy}-\Gamma_{zz}$); and one axis in the xy-plane ($\Gamma_{xy}$). The Laplace equation, $\Gamma_{xx}+\Gamma_{yy}+\Gamma_{zz}=0$, is used to solve for $\Gamma_{xx}$ and $\Gamma_{yy}$.

Figure 4:
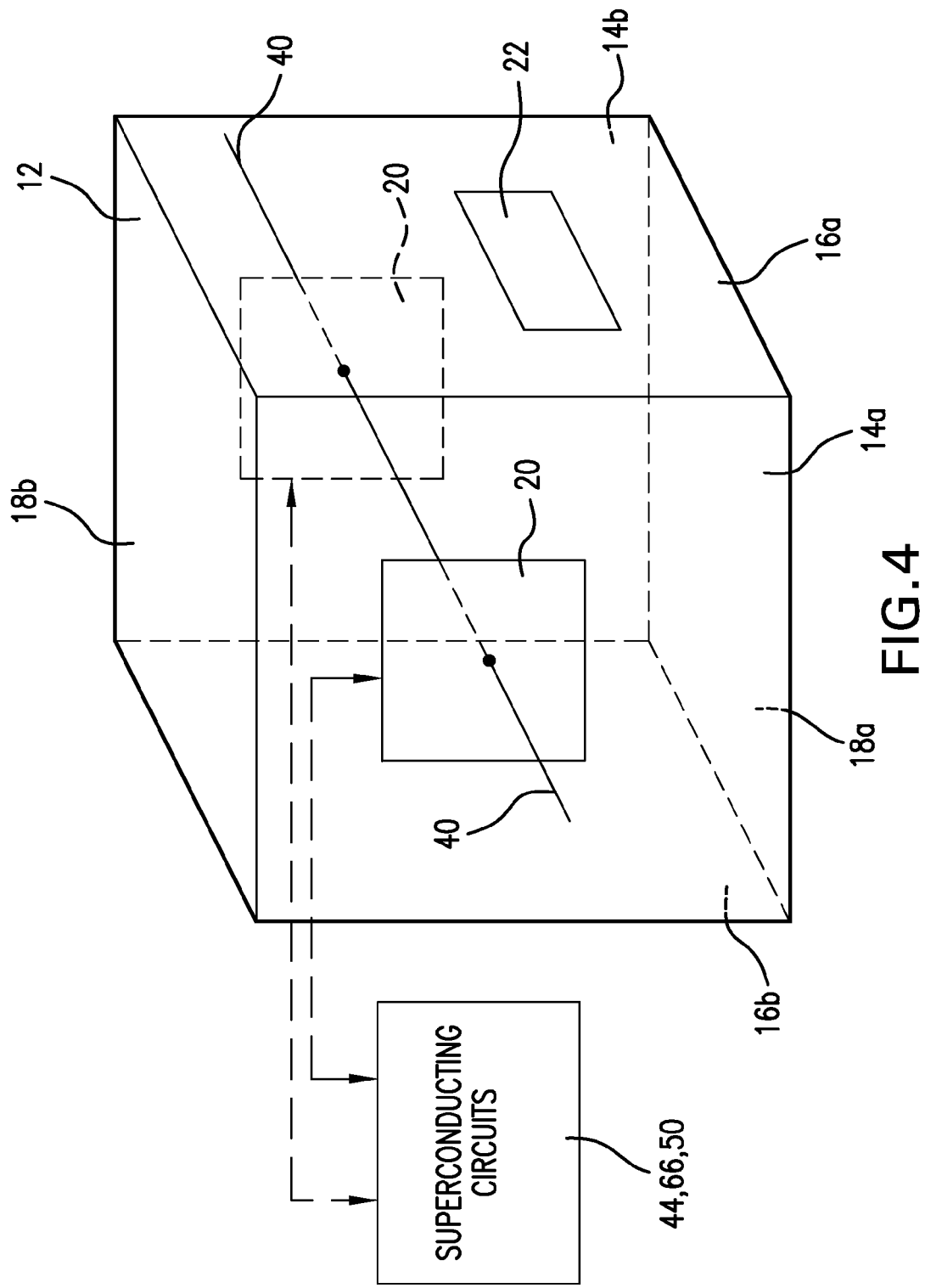
FIG. 4 is a schematic representation of the superconducting gravity gradiometer of the present invention.

Referring to FIG. 4, representing schematically the principles of the three-axis cross-component gradiometer 10 of the present invention, the latter includes a cube 12 having faces 14a-14b, 16a-16b, and 18a-18b. Each pair of faces 14a-14b, 16a-16b, and 18a-18b are orthogonal each to the other, while each pair of the faces includes opposite faces parallel each to the other.

Substantially identical angular accelerometers 20 are positioned on each face 14a-18b of the cube 12, while substantially identical linear accelerometers 22 are located at three perpendicular faces, for example, 14a, 16a and 18a. For the sake of simplicity, only one pair of the angular accelerometers 20 is shown occupying the faces 14a-14b of the cube. It will be clear to those skilled in the art, that, although not shown, a second pair of the angular accelerometers 20 of the gradiometer 10 of the present invention occupies the faces 16a-16b, while the third pair of the angular accelerometers 20 occupies the faces 18a-18b.

Also, as may be seen in FIG. 4, only one linear accelerometer 22 is shown in proximity to the face 16a. It is readily understandable that, although not shown in FIG. 4, the second and the third linear accelerometers are positioned at orthogonal faces, for example, 14a or 14b, and 18a or 18b.

Figure 5:
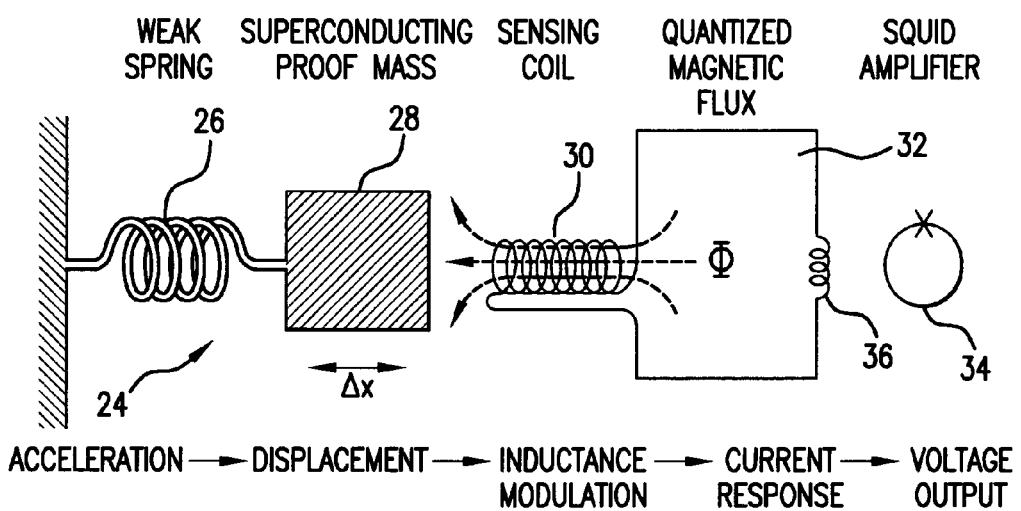
FIG. 5 is a diagram schematically representing principles of a superconducting linear accelerometer.

Both accelerometer types used in the gradiometer of the present invention, e.g., the angular accelerometer 20 and linear accelerometer 22, are superconducting accelerometers, the operation of which is based on the principle scheme including acceleration—displacement—inductance modulation-current response—voltage output, as shown in FIG. 5. Usually, the acceleration-displacement link is implemented as a spring-mass system 24 comprising a weak spring 26 and a superconducting test (proof) mass 28. The inductance modulation in response to the displacement $\Delta x$ of the mass 28 is performed by a sensing coil 30, which changes quantized magnetic flux $\Phi$ in the loop 32, thereby producing a current response to the displacement $\Delta x$ of the mass 28. The current response is amplified in the amplifier 34.

The fundamental limit on the resolution of a spring-mass accelerometer is imposed by Brownian motion in the accelerometer's spring-mass system 24 and Johnson noise in the transducer (coil 30 and loop 32) and associated amplifier 34. A low-temperature ($\leq$4K) environment permits orders of magnitude reduction in both noise sources. The displacement sensing of the mass 28 employs superconducting circuits coupled to a SQUID (Superconducting Quantum Interference Device), which is an extremely sensitive electronic amplifier.

In the basic superconducting accelerometer shown schematically in FIG. 5, the displacement sensing scheme takes advantage of two defining properties of superconductivity: 1) Magnetic flux is excluded from the interior of a superconducting body; and 2) The flux looping in a closed superconducting path is quantized. The sensing coil 30 and the SQUID input coil 36 are connected to form the superconducting loop 32. By trapping a large flux in the loop 32, motion of the proof mass 28 toward the sensing coil 30 forces flux out of the sensing coil 30 and into the SQUID input coil 36. In a typical design, the sensitivity to mass motion is near $10^{-16}$ m Hz$^{-1/2}$.

Figure 6:
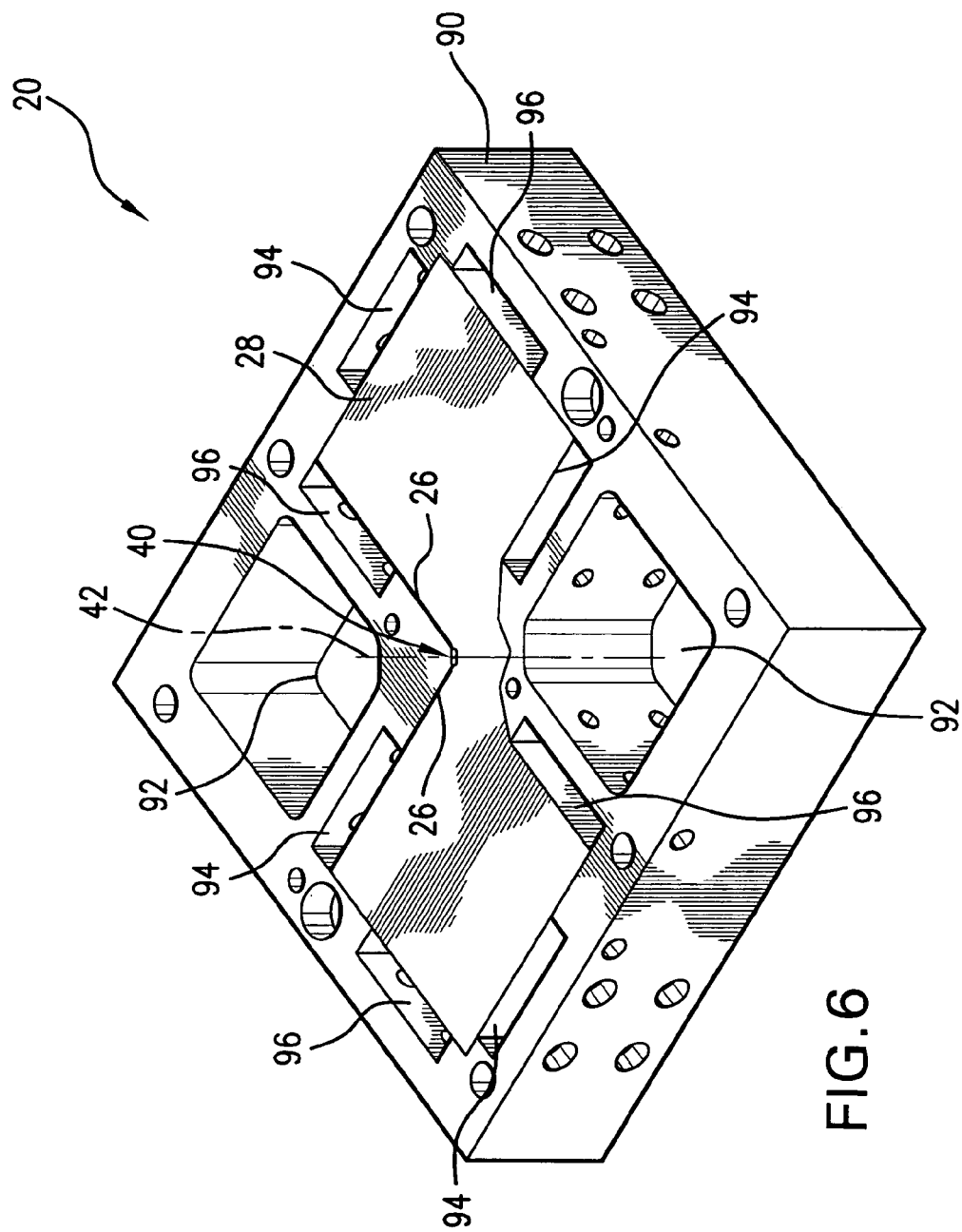
FIG. 6 is a perspective view of the angular accelerometer of the present invention cut from a single block of Nb.
Figure 10:
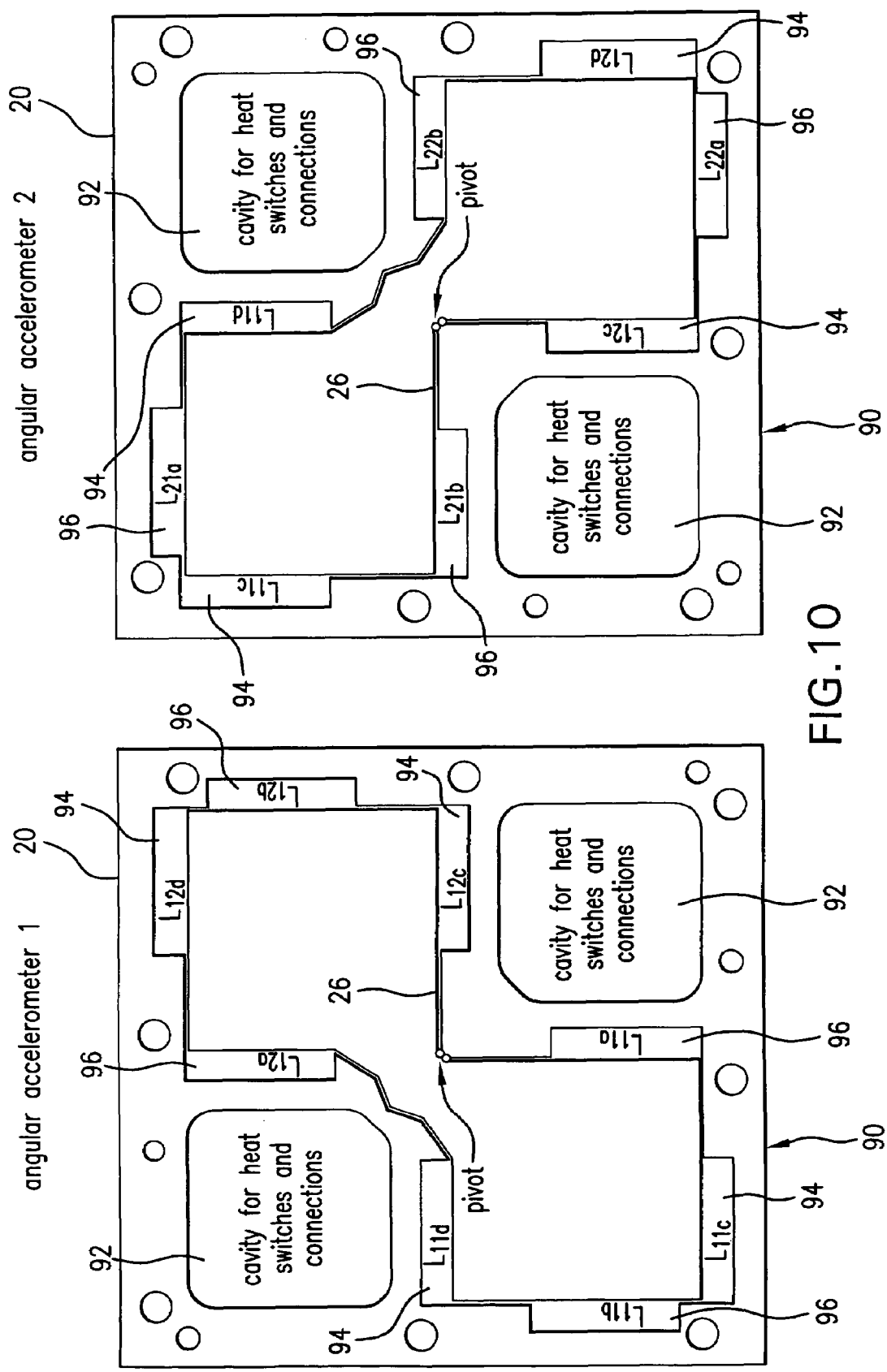
FIG. 10 is a schematic representation of a pair of angular accelerometers and location of the inductive sensing elements (coils)

A component angular accelerometer 20 is shown in FIGS. 6 and 10. The proof mass 28, the spring 26, and the housing are all cut from a single block of Nb. A wire EDM (electron discharge machine) cut accurately defines the proof mass 28 and a flexure pivot 40. The flexure is compliant for rotation about the sensitive axis 42, but remains relatively stiff for motion in other degrees of freedom. After machining, the location of the proof mass c.m. is measured. This is accomplished at liquid nitrogen temperature levels using capacitor plates to sense the proof mass rotation in response to an applied linear acceleration. The accelerometer is then reinserted into the EDM and small sections of mass are removed iteratively until the c.m. offset is reduced to $\leq 0.1$ μm. The design parameters are given in TABLE I.

TABLE I

DESIGN PARAMETERS OF THE CROSS-COMPONENT SGG.

| Parameter | Symbol | Value |
|---|---|---|
| Mechanical | | |
| Accelerometer mass | M | 0.667 kg |
| Radius of gyration | $R_g$ | 3.25 cm |
| Primary moment of inertia | $J_{33}$ | $7.1 \times 10^{-4}$ kg m$^2$ |
| $2J_{12}/J_{33}$ | $\Xi$ | 1.53 |
| Radius to sensing coil | $r_s$ | 2.58 cm |
| Resonance frequency | $\omega_D/2\pi$ | 8.0 Hz |
| Quality factor | Q | $1 \times 10^4$ |
| Electrical | | |
| SQUID resolution | $E_{SQ}$ | $7 \times 10^{-31}(1 + 0.1 \text{ Hz/f})$ J Hz$^{-1}$ |
| SQUID dynamic range | | $10^7$ Hz$^{1/2}$ |
| Energy coupling | $H\beta$ | 0.2 |

The angular accelerometer is sensitive to both angular acceleration resulting from environmental (platform) motion as well as an off-diagonal component of the gravity gradient tensor. To null the sensitivity to platform acceleration, a pair of angular accelerometers 20 are mounted on the platform such that their pivot axes are aligned, as best shown in FIG. 4, and their moment arms are perpendicular. This relative orientation causes the sensitivity to platform acceleration to be of same sense for both accelerometers while the sensitivity to gravity gradient is of opposite sense. The signals from the two accelerometers are then differenced using superconducting circuits schematically shown in FIG. 8, which contain inductive sensing elements. The inductive elements are in close proximity to the test masses, and are designed and oriented such that their inductance is closely proportional to the angular displacement of the test-mass about its sensitive axis. The superconducting circuits include sensing circuitry, mode-splitting circuitry, reading electronics, processing equipment, SQUID, etc. to be described in detail in further paragraphs.

Specifically, the gradiometer 10 of the present invention includes six angular accelerometers 20 and three linear accelerometers 22. Each axis of the gradiometer 10 is formed from a pair of angular accelerometers 20 mounted on the opposite faces 14a-14b, or 16a-16b, or 18a-18b of the precision cube 12 such that their pivot axes 40 are aligned and their moment arms are perpendicular. Each pair of the angular accelerometers 20 is coupled by superconducting circuitry 44 or 50 shown in FIG. 7 or 8 which represents a schematic of the sensing circuit. Each pair of the angular accelerometers 20 is also coupled by mode-splitting circuitry 66, shown in FIG. 9. The coils (inductive elements) 30 from two angular accelerometers 20 are connected in parallel with the input coil 36 of a single SQUID 34. The inductive elements 30 are in close proximity to the test masses 28, designed and oriented such that their inductance is closely proportional to the displacement of the test mass 28 about its sensitive axis.

Figure 7:
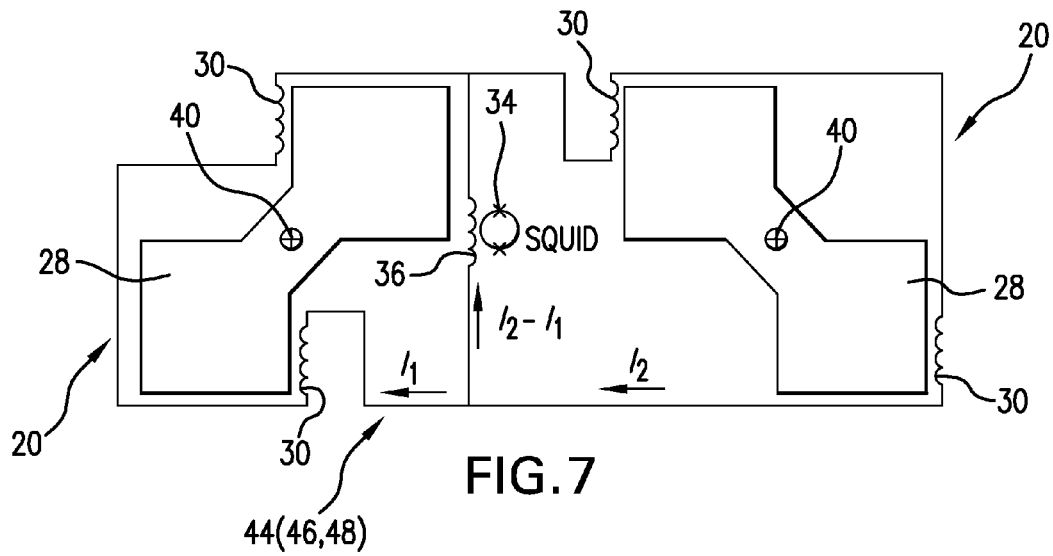
FIG. 7 schematically represents a circuit schematic for a superconducting gravity gradiometer, each using the mass design of the present invention, coupling two mass-spring assemblies.

Persistent currents are stored in various loops by momentarily heating a small section of the circuit while applying a current with an external power source. Heat is applied to warm the small section of the circuit to a temperature above the superconducting transition temperature, thus becoming resistive. This forces the current supplied by an external power source to flow through the inductive elements in the circuit. The heated section of the circuit is then allowed to cool to a temperature below the superconducting transition temperature. Since the circuit now represents a closed superconducting loop, the flux in the loop must remain constant, and the current is "stored" in the circuit. At this point, the external power source can be removed. The difference between the excitation currents, $I_1$ and $I_2$, flows through the SQUID input coil 36, as shown in FIG. 7. If the masses, springs, coils, and coil spacings could be perfectly matched, then the two excitation currents would initially be set equal. As the two masses 28 move, the instantaneous value of $I_1$-$I_2$, is a measure of their relative displacement. That is, if both masses 28 move in the same direction, $I_1$ and $I_2$, change by the same amount, and no signal is generated. In this way, the two acceleration signals are subtracted using persistent currents before amplification. In reality, it is not possible to perfectly match accelerometer components. Nevertheless, the ratio of $I_1/I_2$ is adjusted to account for imbalances. During setup (the process which will be described in detail in further paragraphs), each angular gradiometer 20 is shaken sinusoidally about its axis, and the ratio of $I_1/I_2$ adjusted to minimize response.

Each axis of the superconducting gravity gradiometer 10 has two, identical but separate sensing circuits 46 and 48, one for each operational resonance mode. In the second circuit 48, the direction of excitation current $I_2$ is reversed, so that it senses only common-mode acceleration.

Figure 8:
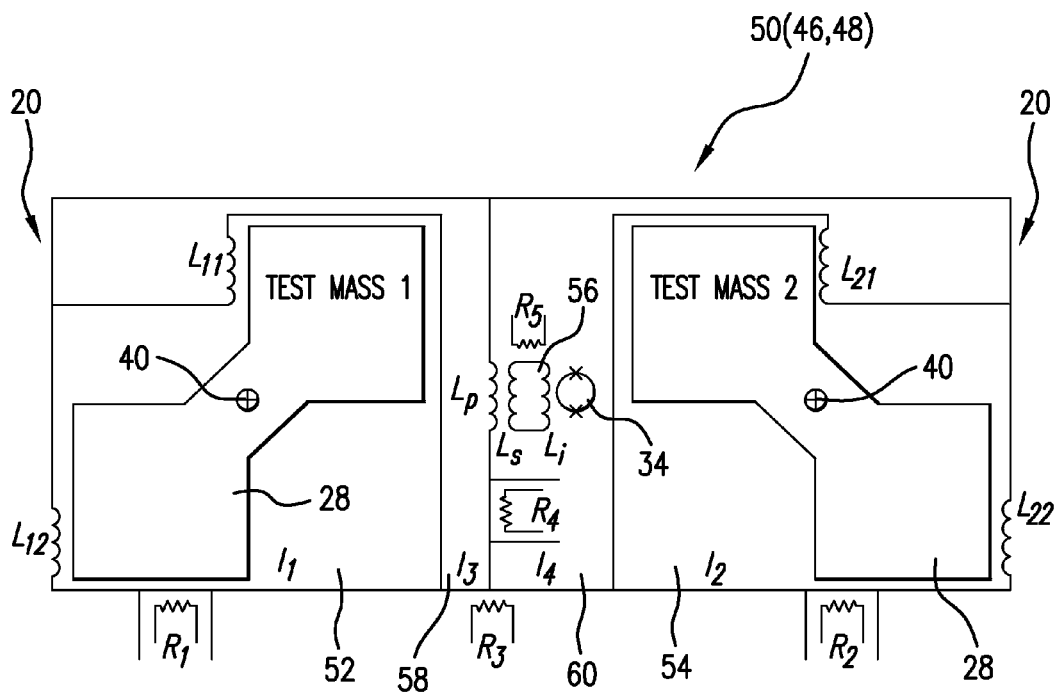
FIG. 8 is a schematic representing a circuitry for combined sensing and tuning in the cross-component superconducting gravity gradiometer of the present invention.

In FIGS. 7 and 8, only one sensing circuit 46 or 48 is shown for the sake of simplicity of illustration. However, it will be readily available to those skilled in the art, that the angular accelerometers 20 in each pair thereof are coupled by two identical sensing circuits 46 and 48, only one of which is presented in FIGS. 7 and 8.

In operation the gravity gradiometer has two principal resonance modes. One that is excited primarily by an acceleration that displaces the test masses in a common direction (common mode) such as platform motion, and a second which is excited primarily by an acceleration that displaces the test masses in opposite directions (differential mode) such as a gravity gradient from a nearby mass. The circuit 48 is allocated for a common-mode, while the circuit 46 is used for the differential-mode. For each sensing circuit (46 or 48), two sensing coils are used for each of the two accelerometers (four sensing coils in total) to provide symmetric torques on the test masses. These four coils are configured in a circuit containing four closed loops, giving additional adjustable parameters (trapped fluxes or persistent currents). These additional parameters can be used to obtain a broad-frequency balance and to reduce the mismatch in the nonlinear response functions of the two accelerometers.

The superconducting circuitry 50, shown in FIG. 8, is designed for combined sensing and tuning in the gravity gradiometer 10 and is used to measure test-mass displacement in the gravity gradiometer. Each of the sensing circuits, 46 or 48, is composed of four closely matched inductors, $L_{11}$, $L_{12}$, $L_{21}$, and $L_{22}$, in two superconducting loops 52, 54 containing persistent currents $I_1$ and $I_2$. The angular accelerometers 20 are sensitive to off-diagonal components of the gradient tensor. The loops 52, 54 difference the signal from two angular accelerometers 20 in order to minimize the sensitivity to angular accelerations of the platform. These two loops 52, 54 are connected in parallel to the primary coil $L_p$ of a superconducting transformer 56, forming two additional loops 58, 60 containing persistent currents $I_3$ and $I_4$. The secondary coil, $L_s$, of the transformer 56 is connected in a superconducting loop to the input coil, $L_i$, of the SQUID amplifier 34. Each circuit loop has two inductors, arranged symmetrically about the pivot point 40 for each test mass 28. The inductors are positioned such that their inductances vary in the opposite sense of a test mass rotation about its center of mass. By properly storing persistent currents in these circuits (as will be presented in further paragraphs) using resistors (heat switches) $R_1$, $R_2$, $R_3$, and $R_4$, either the differential mode (gravity gradient) or the common mode (angular acceleration) may be sensed. The resistor $R_5$ is to protect the SQUID amplifier 34 from high currents.

Referring again to FIG. 8, $R_1$ is used to store current $I_1$ in the loop containing inductors $L_{11}$ and $L_{12}$. Due to the Meissner effect, a clockwise deflection of the superconducting test mass increases the inductance of $L_{12}$ and decreases the inductance of $L_{11}$. The fluxes (inductance×current) in the loop containing $L_{11}$ and $L_p$, and the loop containing $L_{12}$ and $L_p$ must remain constant (these are closed superconducting loops). This forces current to flow through the transformer, and generate a signal at the SQUID proportional to the proof mass deflection. In a similar manner, $R_2$ is used to store current $I_2$ in the loop containing $L_{21}$ and $L_{22}$. If $I_2$ is in the opposite direction as $I_1$, then the current induced in $L_p$ by the angular deflection of test mass 2 will be in the opposite sense to the current induced by an angular deflection of test mass 1 in the same direction. Thus, for perfectly matched inductors and mechanical resonators, no signal will be generated for common motion of the test masses (i.e., the instrument is balanced to be insensitive to platform acceleration about the sensitive axes of the accelerometers). However, for angular deflection of test mass 2 in the opposite direction of test mass 1 (differential motion), the currents induced in $L_p$ by the two test masses will sum, thus generating a signal. Differential deflection will occur when there is relative motion between the instrument and an external mass source.

In reality, the inductors and resonators will not be perfectly matched. The ratio of $I_2$ to $I_1$ can be adjusted to compensate for the mismatch. The frequency band over which this compensation is effective will be determined by the matching of the natural frequencies mechanical resonators. In the sensing circuit, current $I_3$ will increase the natural frequency of resonator a. and, in a like manner, $I_4$ will increase the natural frequency of resonator b. Hence, $I_3$ or $I_4$ can be used to balance the instrument over the entire signal frequency band. Furthermore, numerical modeling has shown that adjusting the ratio of $I_3$ to $I_4$ can reduce the nonlinear response of the instrument to common-mode deflections.

The instrument contains two nearly identical sensing circuits 46, 48 for each gradiometer axis. In the second sensing circuit 48, $I_1$ and $I_2$ are stored to be sensitive to common-mode motion of the test masses. This permits measurement of the platform motion, which is needed to determine error signals. A partial failure of the components of the sensing circuit inhibits the sensing of differential test mass motion; however, many failure modes will not have a significant effect on the sensing of platform motion. Hence the best performing circuit of the two is used to sense differential motion.

By separating the test mass sensing circuits from other duties, such as temperature compensation or linear acceleration compensation, a single circuit can be used to compensate for various mismatched parameters in the mechanical system. These parameters include resonance frequency and linearity in response to platform acceleration. The compensation for multiple parameters is accomplished by adjusting the persistent currents in the various closed loops 52, 54 and 58, 60 of the circuit 50.

The currents may range from 0.01 A to 10 A, depending on the coupling desired. To store currents, the temperature of the heated section of the circuit is raised significantly above the superconducting transition temperature. A Nb wire may be used which has a temperature of ~9.2 k.

Two additional superconducting circuits provide increased linearity. To accomplish this, a mode-splitting circuitry 66 is designed to substantially increase the common-mode resonance frequency while, to the degree that the inductive elements have a linear dependence on the test mass position, it has no effect on the differential-mode resonance frequency. Since the sensitivity of the instrument is proportional to the inverse of the resonance frequencies squared, the mode-splitting circuitry 66 reduces the sensitivity of the instrument to angular acceleration but does not affect the sensitivity to gravity gradient.

Referring again to FIGS. 6 and 9, and to FIG. 10, the angular accelerometer is a modular component which includes a housing 90, test mass 28, and a spring (flexure pivot) 26 integrally cut from a single block of Nb. The modular component includes cavities 92 for heat switches, transformer, high current joints, and connections. The modular block further includes pockets 94 for receiving coils of the sensing circuits 46, 48 and pockets 96 for receiving the coils of the mode-splitting circuits 66. As shown in FIG. 10, the inductors (coils) with "a" and "b" in subscript are the coils of the mode-splitting circuits 66. The inductors with "c" in subscript are for the sensing circuit 46 (differential mode), while ones with the "d" in subscript are for the sensing circuit 48 (common mode).

Figure 9:
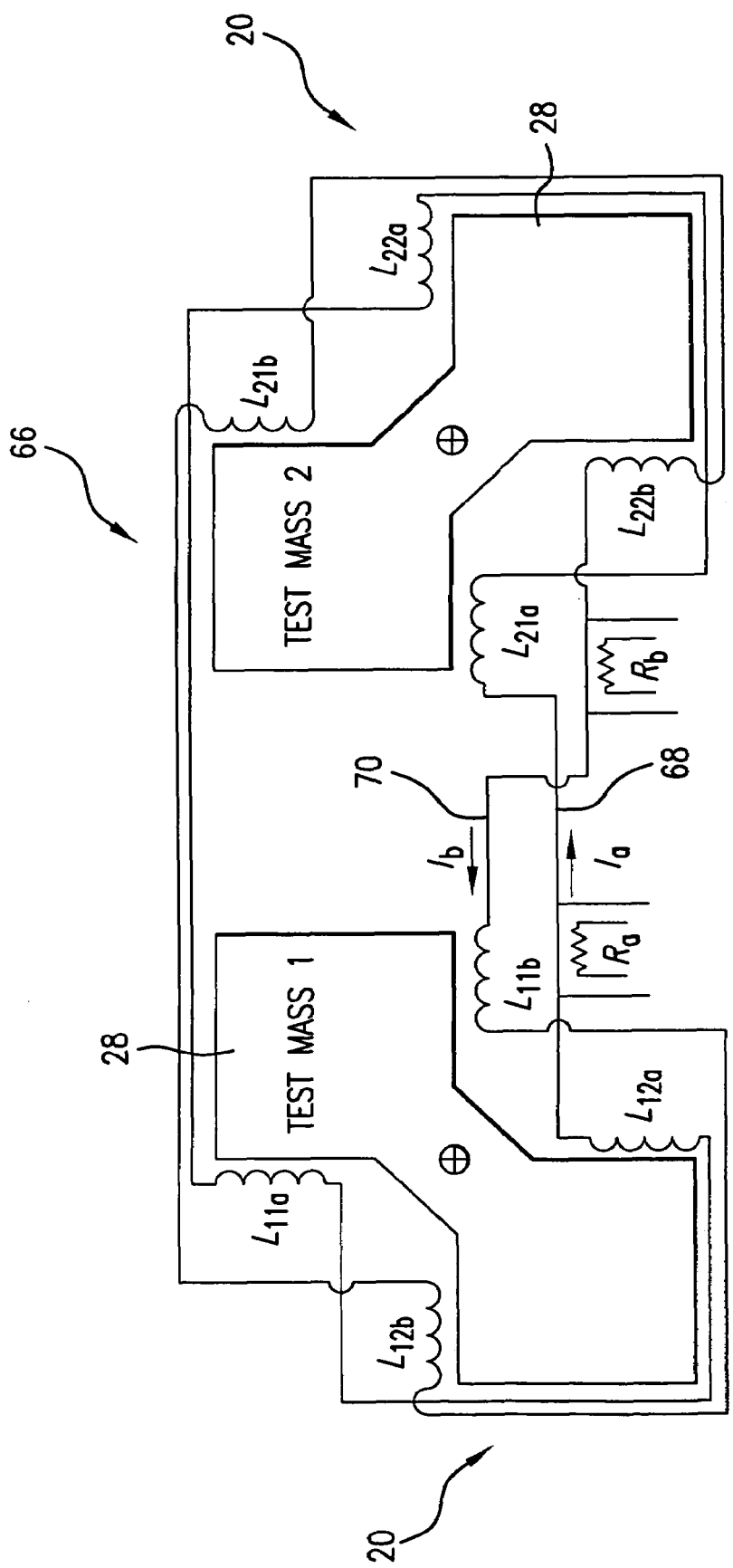
FIG. 9 is a schematic diagram of circuitry for broad splitting of the resonant modes in the cross-component superconducting gravity gradiometer of the present invention.

As shown in FIG. 9, the circuitry 66 is composed of eight matched inductors in two superconducting loops 68, 70 (the inductors $L_{11a}$, $L_{12a}$, $L_{21a}$, $L_{22a}$ in the loop 68, while the inductors $L_{11b}$, $L_{12b}$, $L_{21b}$, $L_{22b}$ in the loop 70). Each of these circuits 68, 70 consists of a single loop of four coils, two for each accelerometer. The circuit 66 is similar to the sensing circuit shown in FIGS. 7 and 8 except that the central path for readout is eliminated. Each two inductors are arranged symmetrically about the pivot point 40 for each test mass. The inductors are positioned such that their inductances vary in the same sense for a test mass rotation about its c.m. Currents $I_a$ and $I_b$ of nearly equal magnitude are stored in the two loops using resistors $R_a$ and $R_b$ to heat a small section of the superconducting circuit while supplying a current with an external source. No net force is applied to the test mass bodies.

For the common-mode motion, the inductance of each loop changes, whereas to the first order it does not change for differential-mode motion. When large currents, typically 5 A, are stored in these loops 68, 70, the common-mode frequency, fc, is raised to approximately 30 Hz. $R_a$ is used to store current $I_a$ in the loop containing inductors $L_{11a}$, $L_{12a}$, $L_{21a}$, and $L_{22a}$. Simultaneously, $R_b$ is used to store current $I_b$ in the loop containing inductors $L_{11b}$, $L_{12b}$, $L_{21b}$, and $L_{22b}$. When test masses 1 and 2 deflect in the same direction, $L_{11a}$, $L_{12a}$, $L_{21a}$, and $L_{22a}$ all increase (or decrease), and $L_{11b}$, $L_{12b}$, $L_{21b}$, and $L_{22b}$ all decrease (or increase). Since the fluxes ($I_a \times (L_{11a}+L_{12a}+L_{21a}+L_{22a})$ and $I_b \times (L_{11b}+L_{12b}+L_{21b}+L_{22b})$) in these closed loops must remain constant, $I_a$ must decrease (increase) and $I_b$ must increase (decrease). This change in currents exerts a force opposing the deflection of the test masses for common motion. When test masses 1 and 2 deflect in opposite directions, $L_{11a}+L_{12a}=-L_{21a}-L_{22a}$ and $L_{11b}+L_{12b}=-L_{21b}-L_{22b}$ and $I_a$ and $I_b$ do not change.

To increase the common-mode resonance frequency, the same magnitude current is stored in the two mode-splitting circuits. The direction of the currents does not matter. The electromagnetic spring constant is proportional to the current squared. The total spring constant is the mechanical spring constant plus the electromagnetic spring constant. The frequency is proportional to the square root of the spring constant. In the simplest model, the higher the common-mode resonance frequency, the better the linearity; however, the persistent currents in the circuit must not exceed the critical current. For the present design, the common-mode resonance frequency can reach approximately 70 Hz. The frequency with no stored current, due to the mechanical spring (the flexure), is 6 Hz. By increasing the common-mode resonance frequency, the circuit 66 serves to reduce the displacement of the test masses in response to angular acceleration of the platform, thus substantially reducing the nonlinear coupling of angular acceleration to the output of the gravity gradiometer. This is a desirable feature in high acceleration environments such as in moving vehicles. A higher common-mode resonance frequency additionally makes the common-mode resonance peak easier to isolate from the vehicle motion noise by ordinary passive or active means.

Increasing the common-mode resonance frequency also broadens the response of the instruments to platform acceleration in the frequency domain. This property is desirable in that it permits determination of the angular velocity well beyond the response bandwidth of the gradient-sensing (differential) mode. The angular velocity may then be used to determine a component of the centrifugal acceleration that will appear in the output of orthogonal gravity gradiometers mounted on the same platform. A single-stage passive vibration isolator with a cutoff frequency at 5 Hz provides 40 dB of isolation at 30 Hz while active systems can provide a higher dB. The stiffness of the differential mode, which must be kept low to maintain the necessary gradient sensitivity, is affected much less strongly—the differential-mode resonance frequency, $f_D$, rises only to approximately 8 Hz.

In general, a higher common-mode frequency will give a more linear response, however, there may be other reasons to tune the common-mode frequency. For instance, the common-mode resonance frequency could be tuned to avoid a resonance in the cryostat or the supporting structure.

Referring again to FIGS. 7 and 8, tuning the ratio of the sensing currents ($I_1/I_2$) provides rejection of angular acceleration about the gradiometer axis. However, deviation from parallelism between the pair of angular accelerometers causes angular acceleration about the other axes to couple into the differential-mode signal. Careful manufacture and assembly gives an intrinsic rejection of angular acceleration of $\sim 10^4$. The mass offset, $\delta r$, causes coupling to linear acceleration. These misalignments can be measured, and used to remove the residual acceleration sensitivity. The common-mode sensing circuits in the gradiometer 10 provide the angular acceleration signals, while separate superconducting linear accelerometers provide the linear signals. Because of the instrument's high inherent rejection, this subtraction can be accomplished with relatively low-cost analog electronics.

The extremely good dimensional stability of materials at the instrument's operating temperature (~3 K) allows misalignments to be measured once during setup. At this temperature, thermal expansion coefficients are $10^3$ to $10^4$ times lower than at room temperature. Furthermore, thermally activated processes such as creep, are effectively frozen out. The overall linear acceleration rejection of the existing in-line component superconducting gravity gradiometer was measured to be stable over the course of weeks to a few parts in $10^8$ and only limited by the resolution of the measurement. The residual acceleration removal electronics provides approximately a $10^4$ rejection. This improves the linear and angular acceleration rejection to $3 \times 10^9$ ($\delta r/R_g$) and $3 \times 10^7$, respectively. Non-cryogenic gradiometers do not have this level of stability and typically use technically challenging instrument rotation and continuous calibration schemes to achieve acceleration rejection.

The ability to subtract the accelerometer signals using quantized flux before amplification greatly reduces the requirements on the dynamic range and linearity of the amplifiers.

Figure 11:
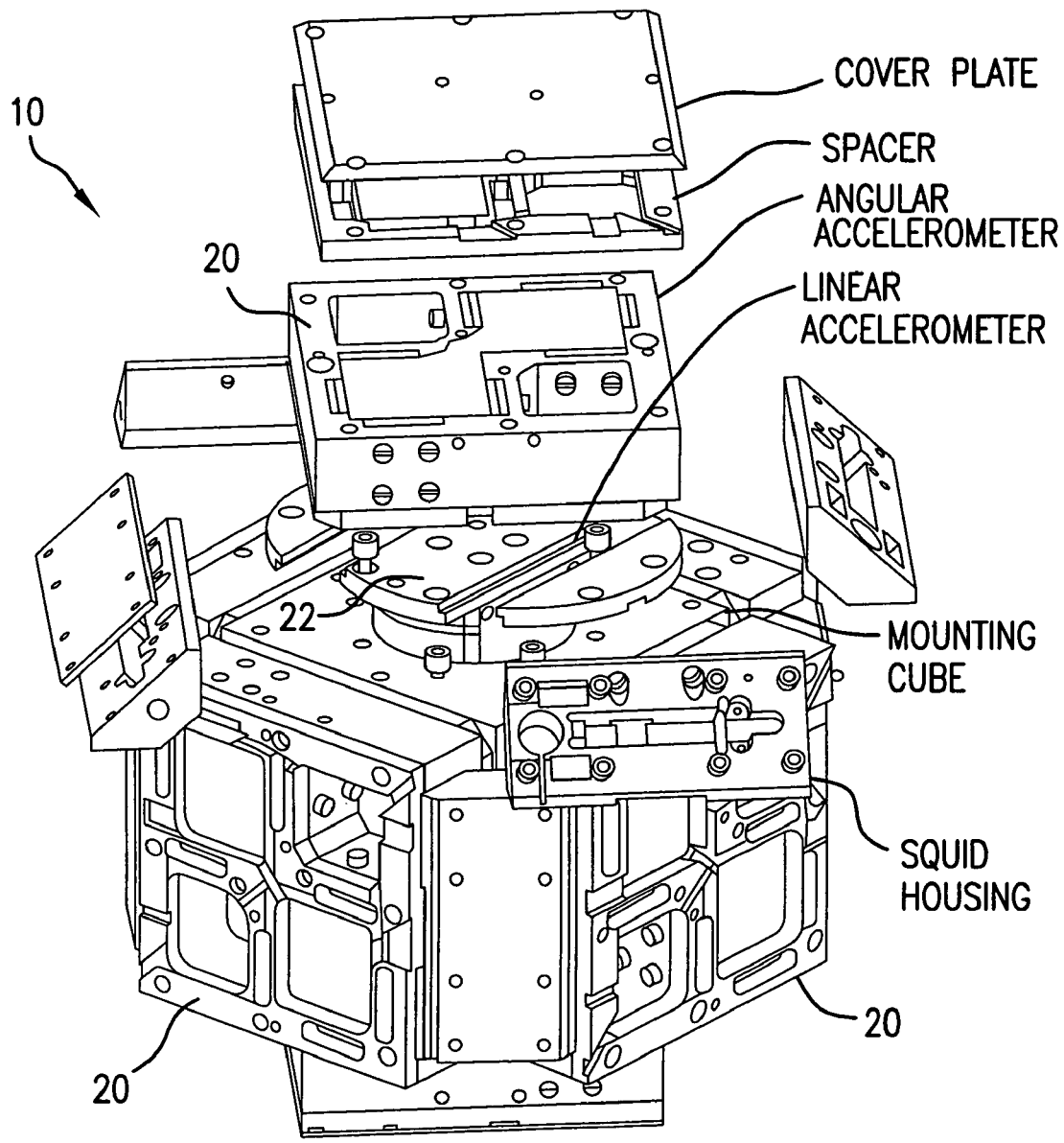
FIG. 11 is a perspective view representing an overall assembly of the mechanical components of the cross-component superconducting gravity gradiometer of the present invention.

Referring to FIG. 11, the instrument required for vertical deflection compensation contains six identical angular accelerometers 20 mounted on the faces of the precision 10.16 cm cube 12. The faces 14a-14b, 16a-16b and 18a-18b of the cube (platform) 12 are machined to an accuracy of 50 μrad for both parallelism and perpendicularity. Opposite pairs of accelerometers 20 are coupled together with superconducting circuits 44, 50, 66 to measure cross-components of the gravity gradient.

Figure 12:
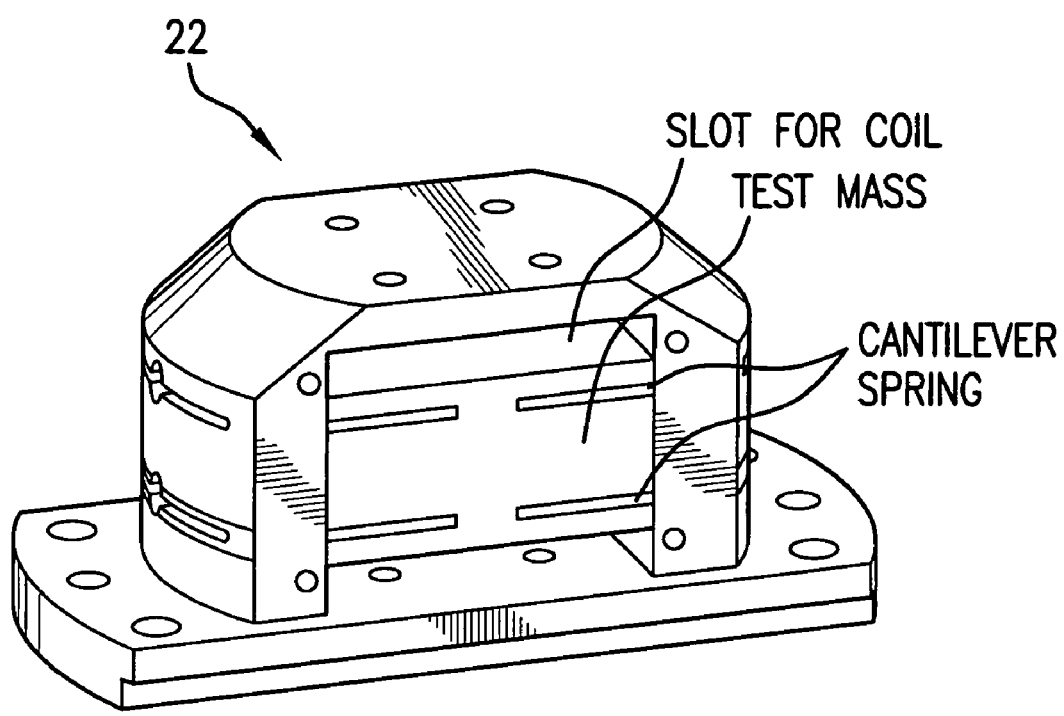
FIG. 12 is a perspective view of the linear accelerometer block cut from a single piece of Nb; and, FIG. 13 is a perspective view of the superconducting gravity gradiometer, cryostat and support structure of the present invention.

The superconducting gravity gradiometer 10 incorporates three linear accelerometers 22 in addition to three pairs of the angular accelerometers 20. These are necessary to correct the residual coupling to linear acceleration through imperfect mass balance. A perspective view of the linear accelerometer 22 is shown in FIG. 12. The proof mass and spring are cut from a single piece of Nb using a wire EDM. This assures an axis alignment approaching $10^{-4}$ rad. The critical parameters of the SGG linear accelerometer design are given in TABLE II.

TABLE II

| DESIGN PARAMETERS OF THE LINEAR ACCELEROMETERS | | |
|---|---|---|
| Parameter | Symbol | Value |
| Mechanical | | |
| Accelerometer mass | m | 0.125 kg |
| Resonance frequency | $\omega_0/2\pi$ | 33.0 Hz |
| Quality factor | Q | 100 |
| Electrical | | |
| SQUID resolution | $E_{SQ}$ | $7 \times 10^{-31}(1 + 0.1 \text{ Hz}/f)$ J Hz$^{-1}$ |
| SQUID dynamic range | | $10^7$ Hz$^{1/2}$ |
| Energy coupling | $\eta\beta$ | 0.1 |

The sensing circuit is similar to that for the basic accelerometer shown in FIG. 5; however, in order to reduce sensitivity to temperature fluctuations, two sensing coils are used in a symmetric arrangement.

To eliminate the need for liquid helium, the gradiometer 10 is cooled by a closed-cycle refrigerator based on a dual-stage pulse-tube cold-head. The pulse-tube has no reciprocating piston, greatly reducing the harmonics of pressure pulses.

Figure 13:
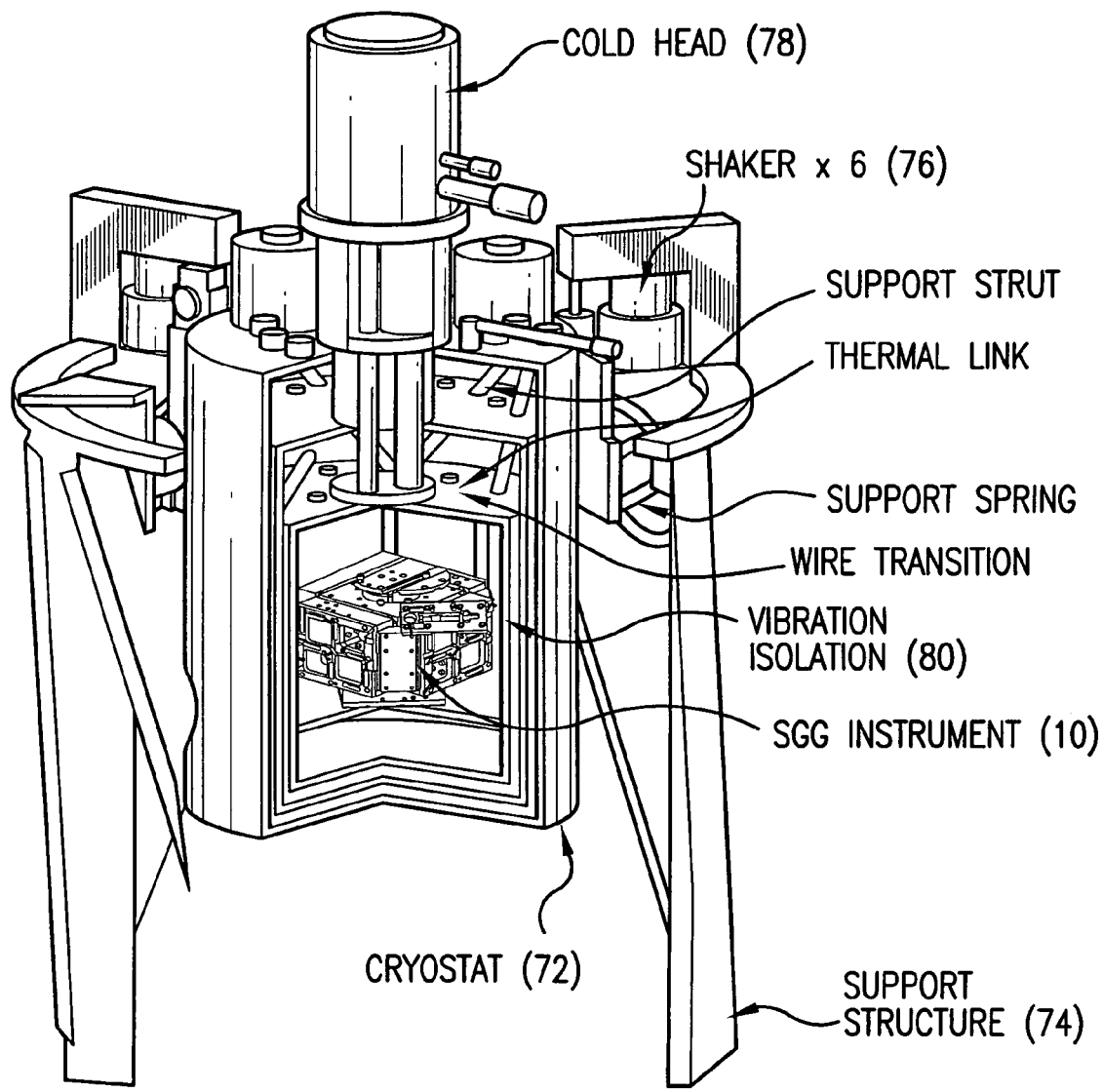

FIG. 13 shows the cryostat 72 with the support structure 74 and shakers 76. The total height of the cryostat 72 and cold-head 78 is approximately 95 cm. The outer diameter of the cryostat is 50 cm. Three linear actuators provide vertical acceleration as well as angular accelerations about two horizontal axes. Auxiliary actuators (not shown) provide horizontal and torsional shaking. The SGG is housed in its own vacuum can and is supported with a 5-Hz isolation stage 80. The dual vacuum arrangement permits the use of helium exchange gas to uniformly cool the SGG, while the isolation stage 80 decouples the gradiometer 10 from high-frequency cold-head 78 and compressor vibrations. Rigid design parameters eliminate modes near gradiometer resonances.

Initial testing of the cryostat has been performed to determine the motion environment imposed on the gradiometer by the action of the compressor and cold-head. These tests indicate a tolerable level for both the linear and angular vibrations.

In operation the gradiometer 10 which includes three pairs of the angular accelerometers 20, three linear accelerometers 22, sensing circuits 46, 48, and mode-splitting circuit 66, is mated with the cryostat 72 and is cooled to a temperature below 9K (preferably 3.0-4.5 K).

Further, persistent currents are stored in the sensing circuits (not shown) of the linear accelerometers 22 and in the common-mode sensing circuits 48. These currents would typically be on the order of 0.01 A. At this point the instrument 10 measures platform acceleration in all six degrees of freedom.

Persistent currents are then stored in the mode-splitting circuits 66 to tune the gradiometer common-mode resonance frequency to the desired value. This value may vary from 0 to 8 A depending on the anticipated motion environment.

The next step is to store persistent currents in the differential-mode (gravity gradient) sensing circuits 46. The value for these currents may range from 0.01 to 2 A.

The platform is then shaken about the sensitive axis of the two angular accelerometers composing a gradiometer axis while monitoring the output of the gradiometer.

Based on the transfer function between the common-mode and differential-mode signals, adjustments are made to the currents in the differential-mode sensing circuit 46 to cancel the sensitivity to platform motion.

This is an iterative process and is repeated for all gradiometer axes. Once balanced against sensitivity to along-axis motion to the best practical level, a gradiometer axis is shaken in other degrees of freedom while monitoring all acceleration outputs. This permits determination of various error coefficients.

The instrument is then ready for measuring gravity gradient signals. During the measurement, the acceleration outputs are recorded along with the gradient output. The acceleration signals are combined with the gradient signal at a level determined by the measured error coefficients to correct for the instrument errors.

Expected Performance of the Gradiometer

Static noise sources

1) Intrinsic Instrument Noise: The minimum power spectral gradient noise is given by the sum of the Brownian motion and SQUID amplifier noise:

$$S_\Gamma(f) = \frac{8}{\xi^2 J}\left[\frac{k_B T \omega_D}{Q(f)} + \frac{\omega_D^2}{4\eta\beta}E_{SQ}(f)\right], \quad \text{(Eq. 10)}$$

where $k_B$ is the Botzmann constant and T is the operating temperature, 3 K. The quality factor, $Q(f)$, will be limited by gas damping, which depends on frequency as $1/f$. With the design parameters given in TABLE I, $S_\Gamma$ is 0.0002 $E^2$ $Hz^{-1}$ ($E \equiv 10^{-9}$ $s^{-2}$) at 0.5 Hz rising to 0.002 $E^2$ $Hz^{-1}$ at 5 mHz. Thus, in the absence of other noise sources, the SGG can resolve less than 0.003 E with a 100-s integration time.

2) Sensitivity to Temperature Fluctuations: Sensitivity to internal temperature fluctuations can be a major source of low-frequency noise in sensitive accelerometers. The temperature sensitivity has been thoroughly studied in the angular accelerometers. Based on these measurements, the temperature coefficient is expected to be 0.03 E $\mu K^{-1}$. Based on the measurements of the temperature stability in the cryostat, the gradient noise due to temperature fluctuations will be between 0.03 E $Hz^{-1/2}$ and 0.3 E $Hz^{-1/2}$ depending on the frequency band. This can be improved with a temperature control stage.

Dynamic noise sources

1) Centrifugal Acceleration: Centrifugal acceleration appears in a gradiometer output as a nonlinear response to angular velocity. This inherent property of the gravity gradient results in contamination of the gradient by angular motion both within and external the signal band. During the development of the gradiometer, a procedure has been designed to properly calculate the centrifugal acceleration using the measured angular acceleration, thus allowing its removal from the measured gradient. This indicates that the removal of centrifugal acceleration to one part in 100 is reasonable. Thus to achieve a gradient resolution goal of 0.1 E $Hz^{-1/2}$ for the dynamic noise, the angular rate of the instrument must be kept below $10^{-4}$ rad $s^{-1}$ $Hz^{-1/2}$.

Since the angular rate coupling is nonlinear, down-conversion of high-frequency angular rate noise into the signal band can occur. This is particularly true when lightly damped modes are present. To minimize this problem, all modes within the gradiometer response band must be well damped. This includes the cryostat isolator modes and the gradiometer resonances. To adequately damp the resonant modes, eddy-current or electronic damping may be required.

2) Angular Acceleration Rejection:

a) First order coupling: To a first order, the rejection of angular acceleration is limited to stability of the gradiometer components, and by relative alignment of the sensitive axes of the accelerometers. As demonstrated with the in-line gradiometer, ultra-low temperatures provide excellent stability. Also demonstrated with the gradiometer is the ability to accurately measure and compensate for the misalignment errors of the gradiometer. The common-mode rejection ratio of the cross-component gradiometer will be similar to that of the in-line gradiometer, which is $3\times10^7$.

b) Higher order coupling: Mismatched nonlinearity in the transfer function of the component accelerometers can be troublesome since it down-converts wide-band high-frequency noise into the signal bandwidth and causes an amplitude dependence of common-mode rejection. Nonlinearity in the accelerometer scale factors may arise from nonlinearity in both the mechanical and electromagnetic components of the accelerometers. To a large degree, the nonlinear response is balanced out, however, the ability to perfectly match springs, coils, and gaps implies that even when the gradiometer is balanced, the nonlinear terms in the force-to-displacement transfer function of the component accelerometers will differ slightly. Consequently, large amplitude common-mode motion can produce some differential displacement.

One way of quantifying nonlinear response is to measure the quadratic response coefficients of the gradiometer. The maximum measured value for the previously tested three-axis in-line gradiometer is $2.7 \times 10^6$ E $(m\ s^{-2})^{-2}$. Though the cross-component gradiometer has a shorter effective baseline, the accelerometers will be more closely matched, substantially reducing this coefficient. A detailed physical model of the gradiometer predicts a quadratic response coefficient of $10^6$ E $(rad\ s^{-2})^{-2}$.

3) Coupling to Linear Accelerations:

a) First order coupling: Linear accelerations couple to the angular acceleration signal through a small offset, δr, of the c.m. of the angular accelerometer's moment arm from the center of bending of its pivot. The output of the angular accelerometer is proportional to the torque, T, about the pivot axis:

$$T = \hat{n} \cdot (\zeta \ddot{\theta} + m \delta r \times \ddot{x}) \quad \text{(Eq. 11)}$$

where $\hat{n}$ is a unit vector along the pivot axis, and m and ξ are the mass and moment of inertia tensor of the test mass. Thus, if $\hat{n}$ is along the 3 axis, an acceleration along the 2 axis will produce an incorrect angular acceleration signal:

$$\ddot{\theta}_x = \frac{m \delta r_1 \ddot{x}_2}{J_{33}} = \frac{\delta r_1}{R_g^2} \ddot{x}_2, \quad \text{(Eq. 12)}$$

where the moment of inertia is written in terms of the radius of gyration, $R_g$, about the 3 axis: $\zeta_{33} = m R_g^2$. By measuring the c.m. offsets and mechanically balancing the test masses, δr's of <100 nm has been achieved.

At low levels of acceleration, the effective δr's can be further reduced by error compensation using the output of the linear accelerometers. A practical limit on the degree of compensation is the alignment of the linear accelerometers. In the current design, this should be $\sim 3 \times 10^{-4}$ rad which gives a residual coupling to linear acceleration of $\sim 30$ E $(m\ s^{-2})^{-1}$.

b) Higher order coupling: At high levels of environmental acceleration, δr can vary significantly due to the finite rigidity of the pivot in the linear degrees of freedom. The dependence of δr on the platform acceleration results in nonlinear coupling of translational acceleration. For the existing design, finite element analysis indicates the shift in δr is 1.4 nm $(m\ s^{-2})^{-1}$. The ability to compensate for nonlinear response has been demonstrated. Additionally a redesign of the pivot can significantly reduce this coefficient at a small loss in sensitivity of the gradiometer.

Linear Accelerometer Performance

The intrinsic instrument noise of the linear accelerometer is given by $$S_a(f) = \frac{4}{m}\left[\frac{k_B T}{Q(f)} + \frac{\omega_0^2}{2\eta\beta} E_{SQ}(f)\right]. \quad \text{(Eq. 13)}$$

Using the values listed in TABLE III, the thermal contribution to the noise is $\leq 10^{-10}$ m s$^{-2}$ Hz$^{-1/2}$ at 1 mHz. At low frequencies, sensitivity to temperature fluctuations will contribute to the noise. Since the sensing coil arrangement is very similar that of the angular accelerometer, the same temperature-to-displacement coefficient may be used to calculate this noise. Using the relationship $\ddot{x} = \omega_0^2 x$ and 5 μK Hz$^{-1/2}$ for the temperature noise level of $5 \times 10^{-11}$ m s$^{-2}$ Hz$^{-1/2}$ is determined.

TABLE III

ESTIMATED PERFORMANCE CHARACTERISTICS

| Term | Magnitude |
|---|---|
| Intrinsic Instrument noise | $[0.0002(1 + 0.1\ Hz/f)]^{-1/2}$ E Hz$^{-1/2}$ |
| Temperature fluctuations | 0.1 E Hz$^{-1/2}$ |
| Angular acceleration rejection | |
| 1$^{st}$ order | $3 \times 10^7$ |
| 2$^{nd}$ order | $10^6$ E (rad s$^{-2}$)$^{-2}$ |
| Linear acceleration rejection | |
| 1$^{st}$ order | 30 E (m s$^{-2}$)$^{-1}$ |
| 2$^{nd}$ order | 12 E (m s$^{-2}$)$^{-2}$ |
| Axis alignment | $10^{-4}$ rad |
| Bias stability | 0.1 E hr$^{-1}$ |
| Dynamic range | $10^6$ (1 Hz bandwidth) |
| Frequency response | $10^{-7}$ –3 Hz |

High-resolution ($\leq 100$ km) gravity maps are required to study geophysical processes that are responsible for shaping the Earth and the ocean. Even higher resolution maps ($\leq 1$ km) are needed to search for natural resources and hidden artificial objects.

Studies of various geophysical processes and exploration of petroleum and minerals require gravity data with a horizontal resolution down to several kilometers or below. Due to the attenuation of short-wavelength components of gravity with altitude, such a high-resolution map requires low-altitude airborne or shipborne gravity survey.

The high accuracy ($\leq 10^{-2}$ E) and high spatial resolution ($\leq 1$ km) expected of the SGG makes it a prime candidate for a device that searches for hidden masses. However, in order to be able to detect hidden objects, a few very stringent conditions must be met: 1) Since the gravity gradient from a point mass falls off as $1/r^3$ with distance r, even a sensitive SGG must be brought to very close proximity to the suspected mass or void to have a reasonable signal-to-noise ratio. This may be difficult to realize for certain types of searches. 2) The density of surrounding terrain must be reasonably uniform or well known, and must be sufficiently different from that of the suspected object. This condition may also be difficult to satisfy in a rugged mountain area. However, if one could survey the same area repeatedly, a small change in gravity signature could be detected by differencing the gravity maps obtained at different times.

With its high sensitivity and wide bandwidth, an SGG or an array of SGGs could be used to rapidly scan large packages or containers, or even missiles for unusual mass distributions. Such a scan would, of course, be completely non-intrusive. This has obvious applications in security enforcement, as well as possible applications in arms control treaty verification.

Although this invention has been described in connection with specific forms and embodiments thereof, it will be appreciated that various modifications other than those discussed above may be resorted to without departing from the spirit or scope of the invention as defined in the appended Claims. For example, equivalent elements may be substituted for those specifically shown and described, certain

What is claimed is:

1. A cross-component superconducting gravity gradiometer having at least one gradiometer axis, the gravity gradiometer comprising:
a pair of substantially identical angular accelerometers at said at least one gradiometer axis, having spring-mass assemblies, mounted on a rigid platform, and having pivot axes thereof aligned each with respect to the other, each spring-mass assembly including a mass defined by a beam integrally joined to a housing by a flexure joint at a center of mass thereof, said flexure joint allowing elastic pivotal displacement about a corresponding pivot axis defined thereby while providing support to resist displacement in other directions, said beam having opposing end portions each being contoured to provide four sensing faces orthogonal to a common plane of said beam;
said pair of angular accelerometers being interconnected by a first sensing circuit and a second substantially identical sensing circuit;
each of said first and second sensing circuits including, for each angular accelerometer of said pair thereof, a pair of inductive sensing elements positioned in close proximity to a respective sensing face of said mass of said spring-mass assembly of each said angular accelerometer, an inductance of each of said pair of inductive sensing elements being in correspondence with an angular displacement of said mass of each said angular accelerometer; and
a Superconducting Quantum Interference Device (SQUID) having an input coil, wherein, in each of said first and second sensing circuits, said pair of inductive sensing elements of each said angular accelerometer is connected in parallel with said input coil of said SQUID, wherein said first sensing circuit is a differential-mode sensing circuit for sensing a gravity gradient, and said second sensing circuit is a common-mode sensing circuit for sensing an angular acceleration.

2. A cross-component superconducting gravity gradiometer having at least one gradiometer axis, comprising:
a pair of substantially identical angular accelerometers mounted on a rigid platform and having spring-mass assemblies, said spring-mass assemblies having pivot axes thereof aligned each with respect to the other, each spring-mass assembly including a mass pivotally coupled to a housing by a mechanical spring;
said pair of angular accelerometers being interconnected by a first sensing circuit and a second substantially identical sensing circuit;
each of said first and second sensing circuits including, for each angular accelerometer of said pair thereof, a pair of inductive sensing elements positioned in close proximity to said mass of said spring-mass assembly of each said angular accelerometer, an inductance of each of said pair of inductive sensing elements being in correspondence with an angular displacement of said mass of each said angular accelerometer;
a Superconducting Quantum Interference Device (SQUID) having an input coil, wherein, in each of said first and second sensing circuits, said pair of inductive sensing elements of each said angular accelerometer is connected in parallel with said input coil of said SQUID; and
mode-splitting circuitry for increasing a resonance frequency of said at least one gradiometer axis in response to acceleration relating to motion of said rigid platform, said mode-splitting circuitry including a pair of superconducting circuits formed in a pair of independent closed loops, each closed loop comprising four matched coils, two of said four coils in each of said pair of superconducting closed loop circuits being positioned symmetrically about said pivot axis of a respective one of said pair of angular accelerometers and on opposing sides of a corresponding mass thereof, currents flowing through said pair of closed loops responsive to deflection of said mass of both of said of angular accelerometers in a common direction exert a corresponding force on each said mass opposing said deflection to thereby add an electromagnetic spring constant to a mechanical spring constant of each said mechanical spring, whereby said angular accelerometers have reduced nonlinear coupling of angular acceleration resulting from motion of said rigid platform to an output of said gravity gradiometer.

3. The cross-component superconducting gravity gradiometer of claim 2, wherein, in each of said first and second sensing circuits, said pair of inductive sensing elements of said pair of angular accelerometers are coupled to subtract signals sensed from each of said pair of angular accelerometers, thereby minimizing the sensitivity of said gravity gradiometer to the angular acceleration.

4. The cross-component superconducting gravity gradiometer of claim 2, wherein first and second persistent currents of respective predetermined values are stored in said first and second sensing circuits, respectively, to control a sensing mode thereof.

5. The cross-component superconducting gravity gradiometer of claim 4, further comprising a superconducting transformer coupled in parallel to said pair of inductive sensing elements of said pair of angular accelerometers and having a primary coil and a secondary coil, said secondary coil being connected in parallel to said input coil of said SQUID, wherein third and fourth persistence currents of respective predetermined values are stored in said primary and secondary coils.

6. The cross-component superconducting gravity gradiometer of claim 5, further comprising resistors of having respective values to adjust said first, second, third and fourth persistent currents, respectively.

7. The cross-component superconducting gravity gradiometer of claim 2, wherein persistent currents of predetermined values are stored in said pair of superconducting closed loop circuits, said predetermined values being selected to increase a common-mode resonance frequency.

8. The cross-component superconducting gravity gradiometer of claim 7, further comprising a pair of resistors, each coupled to a respective one of said pair of superconducting closed loop circuits to adjust said persistent currents stored therein.

9. The cross-component superconducting gravity gradiometer of claim 2, wherein said rigid platform includes a precision cube, further comprising three said pair of angular accelerometers positioned at respective faces of said precision cube, each of said pair of angular accelerometers being positioned perpendicular each to the other, and in each of said pair thereof, said angular accelerometers being positioned at the opposite faces of said precision cube.

10. The cross-component superconducting gravity gradiometer of claim 2, further comprising a linear accelerometer at each of said gradiometer axes.

11. The cross-component superconducting gravity gradiometer of claim 2, wherein said mass, said flexure joint and said housing of each said angular accelerometer is cut from a single block of niobium (Nb) and maintains an integral coupling therebetween.

12. The cross-component superconducting gravity gradiometer of claim 11, wherein said single block further includes at least one cavity for receiving superconducting electronics therein.

13. The cross-component superconducting gravity gradiometer of claim 11, wherein said single block further includes first and second pluralities of pockets formed therein for receiving said inductive sensing elements of said first and second sensing circuits in said first plurality of pockets, and for receiving additional coils of mode-splitting circuitry in said second plurality of pockets.

14. The cross-component superconducting gravity gradiometer of claim 2, further comprising a closed-cycle refrigerator based on a pulse-tube cold-head and mated to said gravity gradiometer.

15. A method of gravity gradient sensing, comprising the steps of:
forming a cross-component superconducting gravity gradiometer by coupling, at each gradiometer axis thereof, a pair of angular accelerometers having aligned pivot axes thereof by a superconducting circuitry containing inductive sensing elements positioned in close proximity to a mass of a spring-mass assembly of a respective one of said pair of angular accelerometers, each spring-mass assembly including said mass defined by a beam integrally joined to a housing by a flexure joint at a center of mass thereof, said flexure joint being integrally formed with said mass and said housing and allowing elastic pivotal displacement about a corresponding pivot axis defined thereby while providing support to resist displacement in other directions, said beam being formed with opposing end portions each being contoured to provide four sensing faces orthogonal to a common plane of said beam, said inductive sensing elements being respectively positioned in proximity to said sensing faces and inductances thereof being a function of an angular displacement of said mass, wherein each pair of said inductive sensing elements is associated with a respective one of said pair of angular accelerometers;
coupling pairs of said inductive sensing elements in parallel to the other to form first and second sensing circuits for said pair of angular accelerometers, each of said first and second sensing circuits including four of said inductive sensing elements; and,
storing in said first and second sensing circuits persistent currents of first and second values, respectively, thereby controlling said first sensing circuit to sense gravity gradient in a differential mode, and controlling said second sensing circuit to sense angular acceleration in a common mode.

16. The method of claim 15, further comprising the step of:
differencing signals from each of said pair of angular accelerometers by coupling said pairs of inductive sensing elements in each of said first and second sensing circuits, thereby minimizing the sensitivity to angular acceleration applied to said gradiometer.

17. The method of claim 15, further comprising the steps of:
coupling a mode-splitting circuitry to said pair of angular accelerometers, said mode-splitting circuitry including a pair of independent superconducting closed loop circuits, each closed loop circuit comprising four matched coils, two of said four coils in each of said pair of superconducting closed loop circuits being positioned symmetrically about a pivot point of a respective mass of one of said pair of angular accelerometers and on opposing sides of a corresponding beam shaped mass thereof, currents flowing through said pair of closed loops responsive to deflection of said mass of both of said of angular accelerometers in a common direction exert a corresponding force on each said mass opposing said deflection to thereby add an electromagnetic spring constant to a mechanical spring constant of each said mechanical spring, whereby said angular accelerometers have reduced nonlinear coupling of angular acceleration resulting from motion of said rigid platform to an output of said gravity gradiometer; and
storing a persistent current of a third value in each of said pair of superconducting closed loop circuits, said third value of the persistent current being selected to increase a common-mode resonance frequency of said second sensing circuit.

18. The method of claim 17, further comprising the step of:
storing the persistent current in said second sensing circuit, said second predetermined value ranging approximately from 0.01 A to 2 A;
storing the persistent current in said pair of superconducting circuits of said mode-splitting circuitry, said third predetermined value ranging approximately from 0 to 8 A;
storing the persistent current in said first sensing circuit, said first predetermined value ranging approximately from 0.01 A to 2 A;
shaking a platform supporting said pair of angular accelerometers about a sensitive axis of said pair of angular accelerometers while monitoring an output of said second sensing circuit, thereby determining error coefficients;
measuring gravity gradient signals output by said first sensing circuit;
combining said outputs of said first and second sensing circuits; and
correcting the gravity gradient signals by applying said error coefficients to said measured gravity gradient signal.

19. The method of claim 15, further comprising the step of:
coupling said inductive sensing elements in parallel to a superconducting Quantum Interference Device (SQUID).

20. The method of claim 15, further comprising the step of:
attaining a cryogenic temperature level by mating said cross-component superconducting gravity gradiometer with a closed-cycle refrigerator based on a pulse-tube cold-head.

* * * * *